(12) United States Patent
King et al.

(10) Patent No.: US 11,285,859 B2
(45) Date of Patent: Mar. 29, 2022

(54) LOW PROFILE DUMP TRAILER

(71) Applicant: Push King Trailers LLC, Morgan Hill, CA (US)

(72) Inventors: Michael Gregory King, San Martin, CA (US); Jeffrey Joseph King, Morgan Hill, CA (US)

(73) Assignee: Push King Trailers, LLC, Morgan Hill, CA (US)

( * ) Notice: Subject to any disclaimer, the term of this patent is extended or adjusted under 35 U.S.C. 154(b) by 0 days.

(21) Appl. No.: 16/724,159

(22) Filed: Dec. 20, 2019

(65) Prior Publication Data

US 2020/0198514 A1 Jun. 25, 2020

Related U.S. Application Data

(60) Provisional application No. 62/782,922, filed on Dec. 20, 2018.

(51) Int. Cl.
| | |
|---|---|
| *B60P 1/32* | (2006.01) |
| *B60P 1/00* | (2006.01) |
| *B60P 1/28* | (2006.01) |
| *B62D 21/20* | (2006.01) |

(52) U.S. Cl.
CPC .............. *B60P 1/32* (2013.01); *B60P 1/003* (2013.01); *B60P 1/006* (2013.01); *B60P 1/283* (2013.01); *B62D 21/20* (2013.01)

(58) Field of Classification Search
CPC .... B60P 1/006; B60P 1/04; B60P 1/28; B60P 3/06; B60P 3/07; B60P 3/10; B60P 3/11; B60P 3/12; B60P 3/122; B60P 3/28; B65F 3/28; B65F 3/201; B62D 53/061; B62D 53/065; B62D 53/062; B62D 53/064; B62D 33/023
See application file for complete search history.

(56) References Cited

U.S. PATENT DOCUMENTS

| | | | | |
|---|---|---|---|---|
| 2,630,928 A | * | 3/1953 | McCombs ................ | B65F 3/28 414/513 |
| 2,751,096 A | | 6/1956 | Darkenwald | |
| 2,789,714 A | | 4/1957 | Norris | |
| 2,937,886 A | * | 5/1960 | Poole .................... | B62D 53/04 280/492 |

(Continued)

OTHER PUBLICATIONS

International Preliminary Report on Patentability for Application No. PCT/US2019/068187, dated Nov. 25, 2020, 25 pages.

(Continued)

*Primary Examiner* — Glenn F Myers
(74) *Attorney, Agent, or Firm* — Intellectual Innovations Legal Advisors

(57) ABSTRACT

A dump trailer comprising a goose neck adapted for removable coupling to a tractor unit and a dropped frame joined to the goose neck and extending rearwardly of the goose neck. A plurality of trailer wheel and axle assemblies are joined to the bottom of the rear of the dropped frame. Each of the plurality of trailer wheel and axle assemblies has left and right wheels suitable for highway travel. An open bed is joined to the top of the dropped frame for receiving cargo. The open bed extends below the goose neck and has a front and a rear opening for permitting discharge of the cargo from the open bed.

20 Claims, 36 Drawing Sheets

(56) References Cited

U.S. PATENT DOCUMENTS

| | | | |
|---|---|---|---|
| 3,175,708 A | 3/1965 | Felts | |
| 3,720,328 A | 3/1973 | MacKenzie | |
| 3,724,695 A | 4/1973 | Taylor | |
| 3,733,089 A * | 5/1973 | Goecke | B62D 53/061 280/417.1 |
| 3,953,170 A | 4/1976 | Webb | |
| 3,963,259 A | 6/1976 | Massey | |
| 4,234,130 A | 11/1980 | Trott et al. | |
| 4,265,477 A * | 5/1981 | Hall | B62D 33/02 296/14 |
| 4,296,941 A * | 10/1981 | Van Wassenhove | B62D 53/065 280/441.2 |
| 4,704,062 A * | 11/1987 | Hale | B62D 53/062 280/441.2 |
| 4,989,918 A * | 2/1991 | Biddy | B60P 1/26 296/51 |
| 7,530,591 B2 | 5/2009 | Mater, Jr. et al. | |
| 9,802,452 B1 | 10/2017 | McCall | |
| 9,862,298 B2 * | 1/2018 | Bushek | B60P 3/122 |
| 10,723,186 B1 | 7/2020 | English | |
| 2003/0214116 A1 | 11/2003 | Rehme | |
| 2006/0087199 A1 * | 4/2006 | Larson, III | H02M 3/24 310/318 |
| 2008/0029996 A1 | 2/2008 | Mater, Jr. et al. | |
| 2013/0175786 A1 | 7/2013 | Curl et al. | |
| 2015/0307143 A1 * | 10/2015 | Marcantonio | B60D 1/143 280/476.1 |
| 2019/0030969 A1 | 1/2019 | Borkholder | |
| 2019/0248266 A1 * | 8/2019 | Cannon | B60P 1/16 |

OTHER PUBLICATIONS

International Search Report and Written Opinion for Application No. PCT/US2019/068187, dated May 4, 2020, 8 pages.

Response to Written Opinion for Application No. PCT/US2019/068187, dated Oct. 20, 2020, 10 pages.

* cited by examiner

LOW PROFILE DUMP TRAILER

CROSS REFERENCE TO RELATED APPLICATION

This application claims priority to U.S. provisional patent application Ser. No. 62/782,922 filed Dec. 20, 2018, the entire content of which is incorporated herein by this reference.

FIELD OF THE INVENTION

This invention relates generally to trailers, and more particularly to dump trailers.

BACKGROUND OF THE INVENTION

A longstanding safety problem exists in the use of dump trailers that tilt to discharge their cargo. In these vehicles, the bed tilts relative to the chassis frame that supports the bed. Raising the bed to discharge material alters the center of gravity of the trailer and accompanying truck, such that the truck and trailer combination may be prone to tipping if this is done on an uneven surface. There are also environments of use where raising the bed is impossible or risky, especially where there are overhead powerlines or overhanging structure such as the deck of a house or a rock ledge. Additionally, there is an emerging market for compact construction equipment, which is not easily able to use traditional dump trucks or trailers due to the height of such dump trucks and trailers.

Dump trailers with ejectors have been provided, but typically also have a high profile and center gravity.

There is a need for a new dump trailer that overcomes the foregoing disadvantages, particularly with respect to compact construction equipment.

BRIEF DESCRIPTION OF THE DRAWINGS

The drawings described herein are for illustration purposes only and are not intended to limit the scope of the present disclosure in any way.

DETAILED DESCRIPTION OF THE INVENTION

Figure 1:
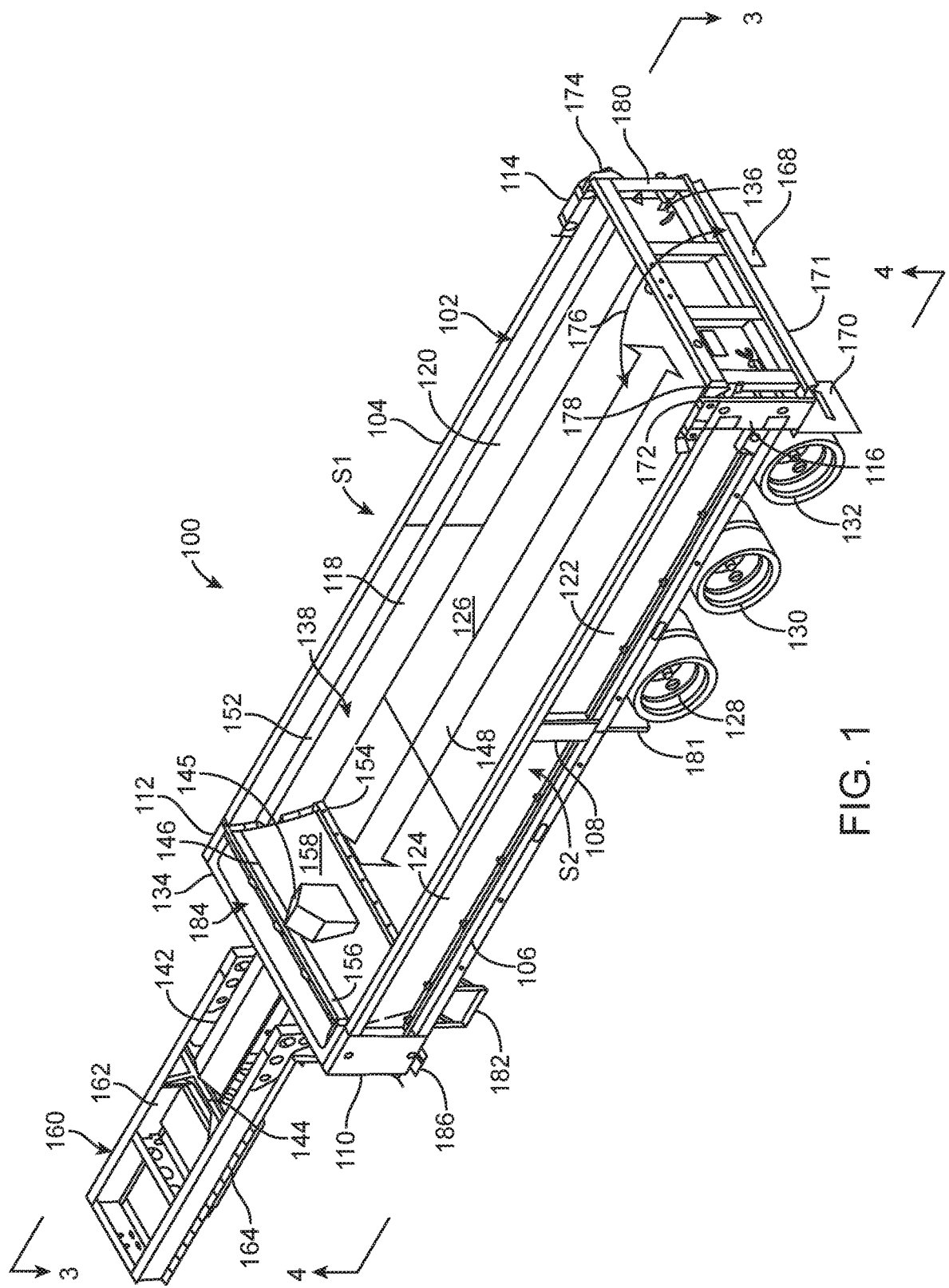
FIG. 1 is an isometric view of an embodiment of the dump trailer of the invention.

The dump trailer of the invention is for use with any suitable motive means, for example a vehicle of any suitable type such as a tractor unit or truck having at least one rear wheel and axle assembly with left and right wheels. The dump trailer can be used for hauling any type of cargo. Such cargo can optionally include rock, gravel, scrap iron, dirt, soil, tar, asphalt, sand, construction materials, trash, debris, demolition debris, broken concrete, materials derived from demolition, garbage, agricultural commodities, agricultural waste or any combination of the foregoing.

The dump trailer can be loaded by any suitable means, including manually or by construction loading equipment. The construction loading equipment can be of any suitable type, for example an excavator, a track loader, a backhoe, a bucket loader, a front loader, a front-end loader, a payloader, a scoop, a shovel, a skip loader, a wheel loader or a skid-steer.

The dump trailer can optionally include a suitable coupling or forward extension of any suitable type, which can be called a goose neck or nose, for removable coupling the dump trailer to the truck tractor or other motive means. A frame, which can be called a framework, a support frame or a chassis support frame, can be joined to the forward extension and extend rearwardly of the forward extension. The frame can have a front and a rear and a top and a bottom. The frame can optionally be a dropped frame, for example be lower in height than the forward extension. A plurality of trailer wheel and axle assemblies, which can be called wheel/axle assemblies, can be joined to the bottom of the rear of the frame. Each of the plurality of trailer wheel and axle assemblies can have at least left and right wheels suitable for highway travel. An open bed can be joined to the top of the frame for receiving cargo, for example from the construction loading equipment. The open bed can have a front and can have a rear opening for permitting discharge of the cargo from the open bed. The open bed can be of any suitable shape and configuration, for example an open box bed with a rectangular cross section or an open half cylinder with a semi-circular cross section.

The dump trailer can optionally be referred to as a low-profile dump trailer or a dropped frame dump trailer. When the frame is a dropped frame, at least a portion of the open bed can optionally extend at a height below the height of the forward extension. For example, the entire open bed can optionally be lower than the forward extension, at least 95% of the open bed can optionally be lower than the forward extension, at least 80% of the open bed can optionally be lower than the forward extension, at least 75% of the open bed can optionally be lower than the forward extension, at least 50% of the open bed can optionally be lower than the forward extension or at least 33% of the open bed can optionally be lower than the forward extension. The open bed can optionally have a top height above ground approximating the height of the forward extension.

The open bed of the dump trailer can have any suitable top height, that is relative to the ground, for example between five and six feet, 5.25 feet (63 inches), 5.50 feet (66 inches), 5.67 feet (68 inches), 6.00 feet (72 inches) or 7.00 feet (84 inches). The open bed of the dump trailer can have any suitable bottom height, for example ranging from 30 to 36 inches.

The open bed of the dump trailer can have any suitable length, width and dimension. The open bed can optionally have an internal height of 32 inches and an internal width of 94 inches. The open bed can optionally have an internal length to its rear opening of 317.75 inches, without inclusion of a dump mechanism within the open bed. The open bed can optionally have a length, measured from the face of a dumping blade within the open bed to the rear opening of the open bed of 288 inches, 300 inches or 360 inches.

The open bed can have a length and a height relative to the ground and any suitable length to height ratio, for example 9:1, 9.375:1, 9.6:1, 11.25:1, ranging from 9:1 to 9:4 or ranging from 9:1 to 11.25:1.

The open bed can have a load capacity at water level ranging from 18.55 to 22.97 cubic yards.

The open bed can have a load capacity in cubic yards at water level and a height in feet and any suitable load capacity to height ratio, for example 5:8:1 (for example 18.5 cubic yards with 32 inch height), 7:1, 8.6:1 or ranging from 7:1 to 8.6:1. The dump trailer can optionally have a maximum achievable payload exceeding 45,000 pounds when the top height of the open bed is between five to six feet above the ground.

The open bed can have a bottom that is positioned above the left and right wheels of the trailer wheel and axle assemblies by any suitable distance, for example 0.25 inch, 6.0 inch or ranging from 0.25 to 6.0 inches.

Where the dump trailer is used with a tractor unit or truck having at least left and right rear wheels having a new tire diameter, the left and right wheels of the trailer wheel and axle assemblies of the dump trailer can each optionally have a new tire diameter that is any suitable percentage of the new tire diameter of the left and right rear wheels of the tractor unit, for example 68%, 75%, 80%, 83% or 100% of the new tire diameter of the left and right rear wheels of the tractor unit. The left and right wheels of the trailer and wheel assemblies of the dump trailer can optionally be smaller in diameter, size or both than the left and right rear wheels of the tractor unit.

The left and right wheels of the trailer wheel and axle assemblies of the dump trailer can optionally have a new tire diameter of 30 inches or ranging from 29 to 44 inches.

The dump trailer of the invention optionally includes a dump mechanism of any suitable type for emptying the open bed of the trailer. For example, the open bed can be tiltably coupled to the rear of the trailer frame and the dump mechanism can optionally include an actuator joined to the front of the frame and the open bed for tilting the front of the open bed upwardly relative to the frame for emptying the open bed. When the open bed is not tiltably coupled to the frame, but instead for example is fixed at its front and rear to the frame, the dump mechanism can optionally include a blade slidably disposed within the open bed and an actuator joined to the blade for urging the blade rearwardly within the open bed towards the rear opening for emptying the open bed. The blade can extend any suitable percentage of the length of the open bed, for example the interior length of the open bed, between is fully retracted position and its fully extended position, for example, 90%, 95%, 98% or 100% of the length of the open bed. The actuator can optionally be disposed within the forward extension of the dump trailer, for example a goose neck of the trailer. In this regard, the actuator can optionally be disposed within the confines of the forward extension, for example the gooseneck, so as to not extend above the trailer. The actuator can optionally be nested within the forward extension.

The dump trailer includes a chassis support frame that supports an open-top bed, which can optionally be coupled in a substantially fixed relationship to the chassis support frame to prevent tilting of the open-top bed relative to the chassis support frame. The open-top bed optionally has a tailgate opening at the rear of the open-top bed. The optional tailgate can optionally be selectively positionable between a closed configuration covering the tailgate opening and an open configuration away from the tailgate opening. A nose, gooseneck or forward extension is coupled to the chassis frame and extends forward of the bed. The nose, or gooseneck, has a trailer hitch connector for coupling the trailer to a truck tractor unit or other suitable vehicle. The nose, or gooseneck, can optionally support a hydraulic cylinder that is arranged for selective extension and retraction movement along a longitudinal path of travel between forward and rearward positions along the bed. A blade is optionally coupled with the hydraulic cylinder for motion along the path of travel concomitant with the selective extension and retraction movement such that rearward extension of the hydraulic cylinder when cargo is in the bed pushes the cargo from the bed and through the tailgate opening. At least one wheel assembly is coupled to the bottom of the chassis support frame for support thereof and permitting movement of the dump trailer along a transportation network.

The bed may optionally be provided with right and left sidewalls running in parallel to the longitudinal path of travel of the dump trailer. Each of the opposed sidewalls may optionally have a guide rail running in parallel to the longitudinal path of travel, for example down the length of the sidewall. The blade optionally has a right lateral edge facing the right sidewall and a left lateral edge facing the left sidewall. The left lateral edge of the blade can optionally define a recess of complimentary dimensions for receipt of the guide rail on the left sidewall. The right lateral edge can optionally define a recess of complimentary dimensions for receipt of the guide rail on the right sidewall. This structure advantageously permits the guide rails to stabilize the blade during travel of the blade down the bed, for example when discharging cargo from the bed. The blade stabilization can optionally be further enhanced by tilting the bottom of the blade rearward out from the top and by providing the blade with a concave rearward facing surface. For example, each guide rail can optionally be provide with a downwardly extending ridge along its length for engaging an upwardly extending lip or protuberance on the respective side of the blade.

The trailer hitch connector may optionally be a king pin for a fifth wheel connector where the hitch is composed of a kingpin on the trailer and a fifth-wheel on a truck tractor. The dump trailer may optionally be constructed for a maximum achievable payload exceeding 45,000 pounds when the trailer is limited to a height of 5 feet 6 inches where regulations prescribe a gross combination weight (tractor and trailer) of 74,5000 pounds. While a lower height can be particularly advantageous, in other applications the dump trailer may be, for example, limited to a maximum height of 14 feet or maximum height of regulatory agency requirements, such as those for state and federal motor carriers.

The dump trailer may optionally be used in a method of dumping. The dump trailer may optionally be coupled to a motive means, such as a truck or tractor unit. The bed of the trailer can be filled with cargo, such as sand, rock, asphalt, broken concrete, materials derived from demolition, garbage, agricultural commodities, agricultural waste, construction equipment, dirt or scrap iron. Suitable construction loading equipment can be utilized for loading the dump trailer, for example an excavator, a track loader, a backhoe or other construction equipment small enough to fit within the cargo area. The bed can optionally be loaded when the blade resides at a forward position in the bed and the tailgate is in a closed configuration. The motive means can be driven with the dump trailer attached to haul the cargo from a first location to a second location. An hydraulic cylinder can optionally be provided in the dump trailer and actuated at the second location to move the blade rearward with concomitant discharge of the cargo. The tailgate can optionally be opened by the discharged cargo or mechanically by any suitable actuation means carried by dump trailer and coupled to the tailgate.

The embodiments of the invention set forth herein, for example below, are examples of the invention, and may in some instances be broader or narrower than the foregoing discussion of the invention but are not intended to limit the breadth of the invention. Any additional features of the invention set forth in such embodiments are optional. A feature of any embodiment set forth herein can optionally be combined with any other embodiment of the invention, with or without any other feature of any embodiment set forth herein. All characteristics, steps, parameters and features of the methods below are not limited to the specific embodiments or specific parts set forth below, but instead can optionally be applicable to the foregoing discussion of the invention and to all embodiments of the invention. Broad terms and descriptors are sometimes replaced with more specific terms and descriptors herein not to limit a disclosure to a specific term or descriptor but merely for ease of discussion and understanding.

An embodiment of a dump trailer of the invention is illustrated in FIGS. 1-6. Dump trailer 100 therein, which can optionally be referred to as an ejector-dump trailer 100, includes a structural frame 102 including an upper rectangular frame section 104 and a lower rectangular frame section 106. The upper and lower rectangular frame sections 102, 104 are optionally reinforced by vertical medial posts 108 and similar posts 110, 112, 114, 116 at each corner. Sidewalls S1 (right) and S2 (left) are formed from steel panels 118, 120, 122, 124 that may be bolted, riveted, welded or otherwise suitably jointed to the frame 102. A planar bottom 126 is formed of welded sheet steel panels. The frame 102 is mounted to a chassis support frame (not shown) to which are connected wheel/axle assemblies 128, 130, 132, which can optionally be referred to as wheel and axle assemblies, by use of suspension mounts (not shown). A front wall 134 and optional tailgate 136 define an open-top cargo bed 138 that, in use, may be filled with any material that is capable of being hauled by a dump truck, such as rock, gravel, scrap iron, dirt, asphalt, sand, trash, debris, demolition debris or construction material. Although cargo bed 138 is shown as being a box bed, it may be semicircular or any other suitable shape in cross section.

The bottom 126 is optionally coupled to the chassis support frame (not shown) in such a manner as to prevent substantial tilting, as for example would be needed to empty the cargo bed 138 in a trailer that dumps by raising the elevation of the front wall 134 to cause the cargo to slide rearward under the tailgate 136 when the tailgate 136 is open. The ejector-dump trailer 100 does not operate in this tilting manner. A telescoping hydraulic cylinder 142 is optionally pivotally attached, such as by lateral pinning, to a cross-wall 144 and a receptacle 145 in blade 146 such that selective actuation of the telescoping hydraulic cylinder 142 extends and retracts the blade 146 on path 148 with sufficient force to discharge cargo from the cargo bed 138 and then retract the blade 146 to a position proximate the front wall 134. One or more safeguards may optionally be built into the telescoping hydraulic cylinder 142, such as an internal hydraulic vent port opening (not shown) that prevents extension past the tailgate 136, and another that prevents an undue extent of contraction proximate the front wall 134.

Slots 150 in the side of blade 146 have complimentary dimensions for receipt and engagement with a pair of opposed optionally guide ribs or rails 152 that can be mounted on the sidewalls S1, S2 to prevent or mitigate the bottom edge 154 of the blade 146 from overriding cargo in the cargo bed 138 as the blade travels rearward on path of travel 148. The blade 146 is tilted at an angle β that places the bottom edge 154 rearward of top edge 156. Use of the guides 152 in combination with rearwardly concave curvature of a rearward surface 158 on the blade 146 generally force the bottom edge 154 of the blade 146 downward into engagement with the upper surface of the bottom wall 126 to provide a scraping effect that closely removes cargo from atop the bottom wall 126 as the blade 146 is rearwardly extended. It will be appreciated that the path of travel 148 runs in parallel with the guide rails 152, and that these guiderails stabilize the blade 146 to prevent undue wear of the blade 146 and bed.

The bottom rectangular frame section 106 extends forward to facilitate rigid attachment of a nose 160, which can be referred to as a gooseneck or forward coupling extension, that optionally provides a mounting platform for the telescoping hydraulic cylinder 142 using cross-wall 144, as described above. The nose 160 is optionally formed of a generally L-shaped frame 162 that rises from the bottom rectangular frame section 106 and then extends horizontally towards the front to present a fifth-wheel hitch component 164 at a suitable height for attachment to a semi-tractor. The cargo bed 134 of ejector-dump trailer 100 can optionally approximate the cargo bed of a normally sized rear-tilting dump truck, but advantageously has approximately half the height profile of that class of dump truck. Depending upon the scale of the ejector-dump trailer 100, other hitches may suffice, such as a goose-neck or ball hitch (not shown) in place of the fifth wheel hitch component 164.

The ejector-dump trailer 100 optionally has certain conventional features, such as lights 166 mud flaps 168, 170, and bumper 171. The tailgate 136 optionally has opposed barrel latches 172, 174 that may be unlatched, permitting the tailgate 136 to pivot from a top axis to travel on arc 176 terminating where locking hydraulic tailgate lifters equipped with safety valving 114, 116 retain the tailgate 136 in a generally horizontal configuration that is substantially aligned with the top surface of the bottom 126 for ease of discharge. An optional forward mud flap 181 can be provided. A ladder rung 182 optionally drops down proximate the front wall 134 to facilitate access for maintenance of the blade 146 and the telescoping hydraulic cylinder 142.

A space 184 can optionally be provided between the rear of the blade 146 and the front wall 134. At the bottom of this space can be an optional opening (not shown) that discharges into a collection pan 186 that is configured laterally with a hinge and a retainer pin for cleanout. The opening and collection pan 186 are optionally provided for removal of cargo, such as debris, that may become trapped between the front wall 134 and the blade 146.

Figure 2:
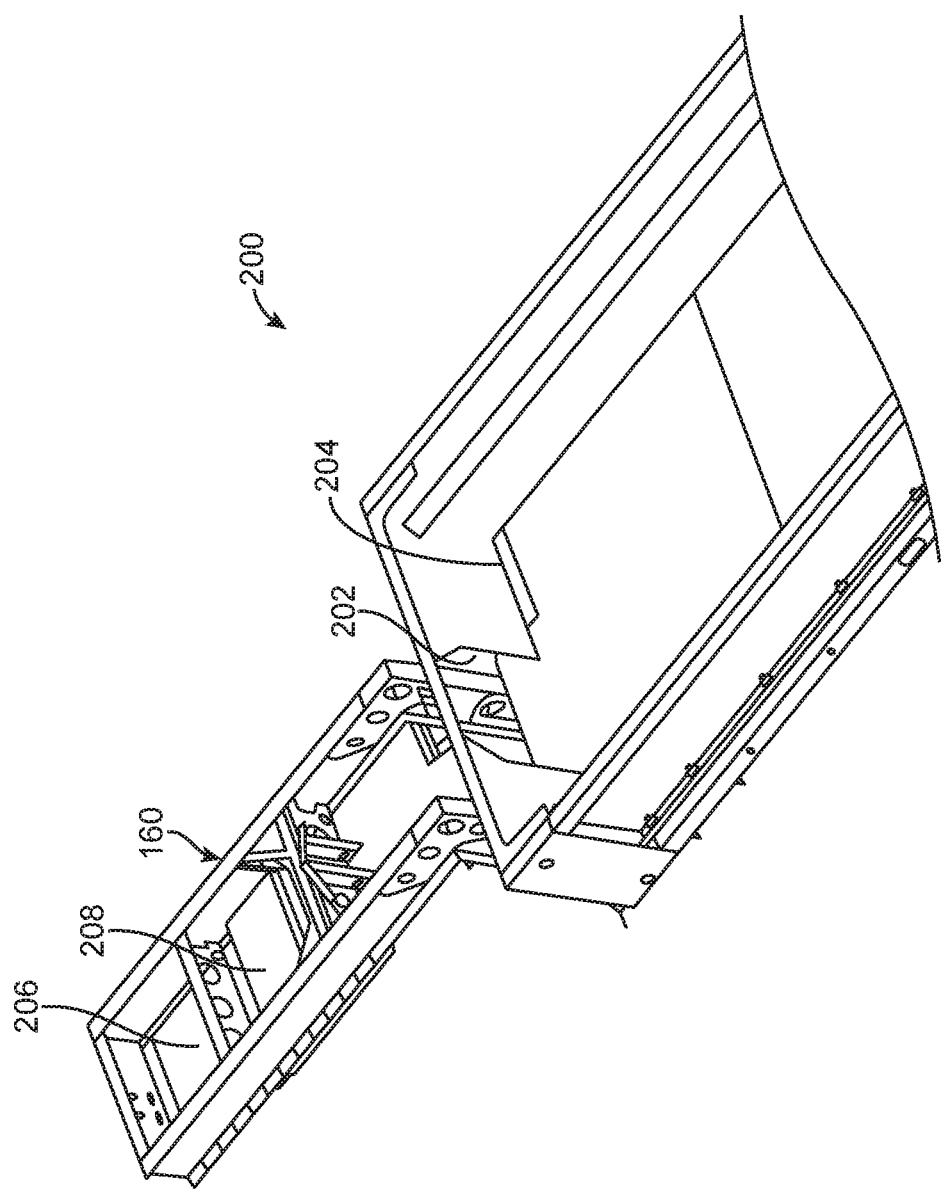
FIG. 2 is an enlarged isometric view of the portion of the dump trailer of FIG. 1 with the ejector removed from the dump trailer.

FIG. 2 shows the front end 200 of the ejector-dump trailer 100 with the blade 146 and the telescoping hydraulic cylinder 142 removed to reveal an opening 202 in the front wall, 134 that permits passage of the telescoping hydraulic cylinder 142 through the front wall 134. FIG. 2 also shows an optional opening 204 that discharges into the collection pan 186 for cleanout of space 184 (see FIG. 1). The nose 160 optionally contains mounting boxes 206, 208 that may be used for mounting a hydraulic pump with associated manual controls, as well as a tank for hydraulic oil and tools.

Figure 3:
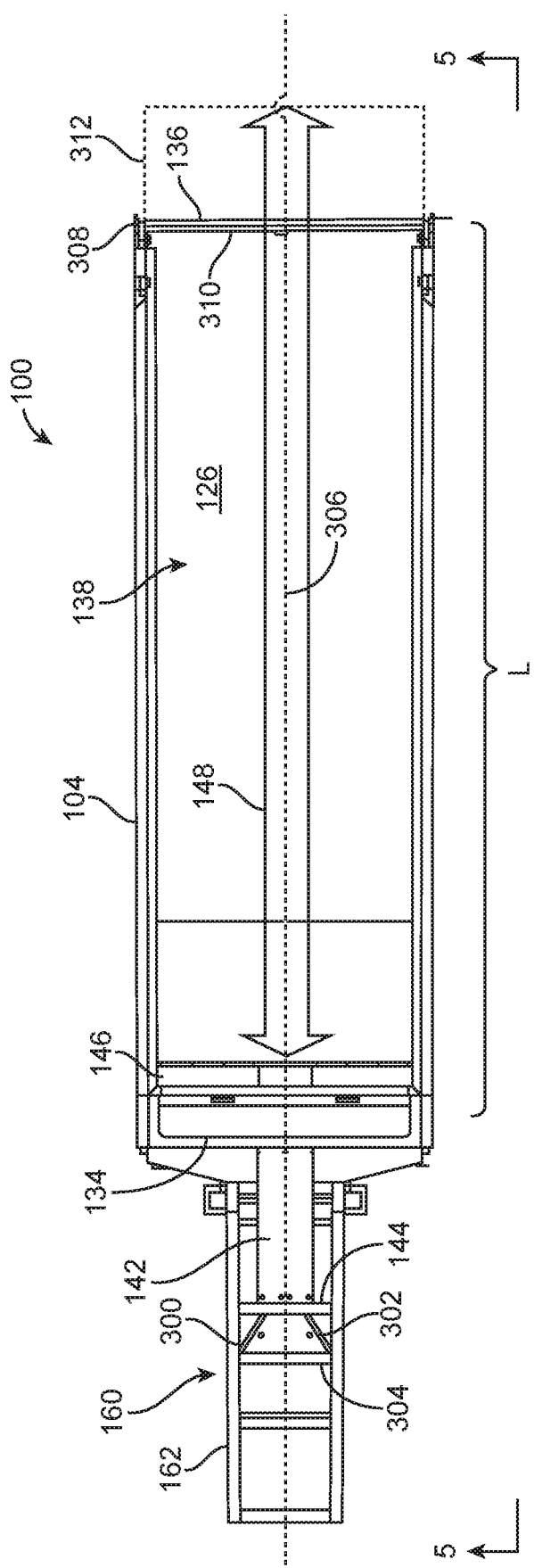
FIG. 3 is a top plan view of the dump trailer of FIG. 1 taken along the line 3-3 of FIG. 1.

FIG. 3 is a top plan view of the ejector-dump trailer 100 showing an optional pair of opposed trusses 300, 302. The trusses 300, 302 extend from a cross-wall 304 that is forward of the cross-wall 144 to which the telescoping hydraulic cylinder is anchored, and travel rearwardly while narrowing towards a longitudinal axis 306 in support of the cross-wall 144. As shown in FIG. 3, the path of travel 148 of blade 146 may run almost the full or the full length L of the bed 138. This is because the hydraulic cylinder 142 can be optionally mounted on the nose 160, which permits the rear of blade 146 to reside in close proximity to the front wall 134, and may even abut the front wall 134. The path of travel 148 may traverse, for example, 90%, 95%, 98% or 100% of the length L extending between the front wall 134 and the tailgate 136.

As shown in FIG. 3, the optional tailgate 136 can be moved to a closed configuration 308 that covers an opening 310 at the rear of the bed 138. The closed configuration 308 prevents or mitigates spillage of cargo from within the bed 138 in the intended environment of use. The tailgate 136 is selectively repositionable to an open configuration where the tailgate 136 is removed from the opening 310 to permit discharge of cargo from the bed 138 by virtue of the action of blade 146. The tailgate 136 may optionally be constructed to pivot in proximity to the bottom 126 such that the tailgate either drops to a vertical position generally lower than the bottom 126, or the tailgate 136 may be retained by hydraulics (not shown) or chains and the like to extend horizontally and in parallel to the bottom 126 as represented by position 312. When the tailgate is designed for this type of horizontal positioning, the path of travel 148 may exceed the total length L of the bed 138 as the blade traverses out over the horizontally extended tailgate 136.

The dump trailer may be provided with other tailgate configurations including, for example, two door style tailgates with hinges on opposing ends, single door style with hinges on one side, a folding ramp style tailgate to facilitate equipment loading, or a hydraulic lift tailgate. Alternately, the dump trailer may be offered without a tailgate.

Figure 4:
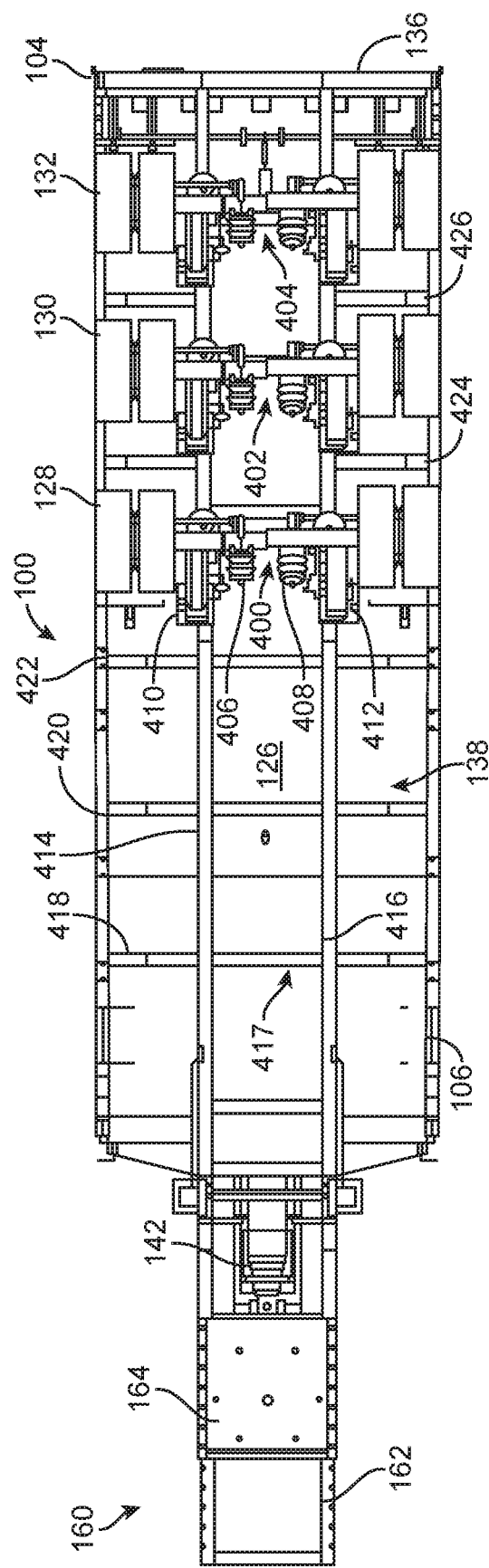
FIG. 4 is a bottom plan view of the dump trailer of FIG. 1 taken along the line 4-4 of FIG. 1.

FIG. 4 is a bottom plan view of the of the ejector-dump trailer 100 showing air-adjustable shock suspension systems 400, 402, 404, each comprised of a pair of air shocks 406, 408 in opposing front-rear orientations, together with suspension assemblies 410, 412 coupling the wheel/axle assemblies 128, 130, 132 with longitudinally extending chassis support frame members 414, 416. The chassis support frame 417 includes also lateral cross-members 418, 420 422, 424, 426 which support the bottom rectangular frame section 106 of the bed 138. The lateral cross-members 418, 420, 422, 424, 426 are rigidly affixed to the chassis frame members 414, 416 and the bottom rectangular frame section 106 such that the bed 138 does not tilt relative to the chassis frame member 414, 416. In like manner, the chassis frame members and the bed 138 do not tilt relative to the wheel/axle assemblies are 128, 130, 132, which are located on the rear half of the ejector-dump trailer 100. While the trailer depicted in FIG. 4 is an air-ride trailer, other suspensions such as spring and trunnion suspensions may be utilized.

Figure 5:
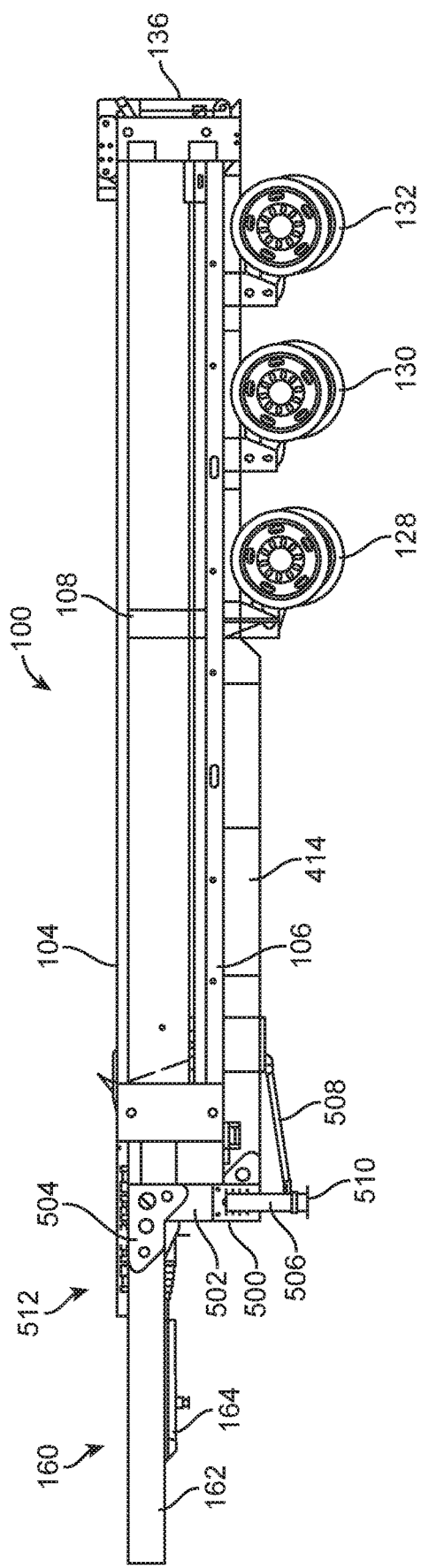
FIG. 5 is a left side elevational view of the dump trailer of FIG. 1 taken along the line 5-5 of FIG. 3.

FIG. 5 is a side plan view of the ejector-dump trailer 100 that provides additional detail regarding the manner of attaching the L-shaped nose 160 to the ejector-dump trailer 100. An optional first steel plate bracket 500 is bolted or riveted or welded to the chassis frame member 414 and a riser 502 An optional second steel plate 504 couples the riser 502 with a horizontal forward extension frame member 506. An optional vertical post 506 may be a tubular member of square or circular cross-section, and this may be supported by a brace 508. The vertical post 506 telescopingly receives an optional extensible foot 510 that may be extended and retracted by select actuation of a hydraulic cylinder or a hand-cranked gear assembly in the nature of a jack (not shown). The extensile foot 510 supports the front end 512 of the ejector-dump trailer 100 when the trailer is not attached to a truck or tractor unit for hauling operations.

Figure 6:
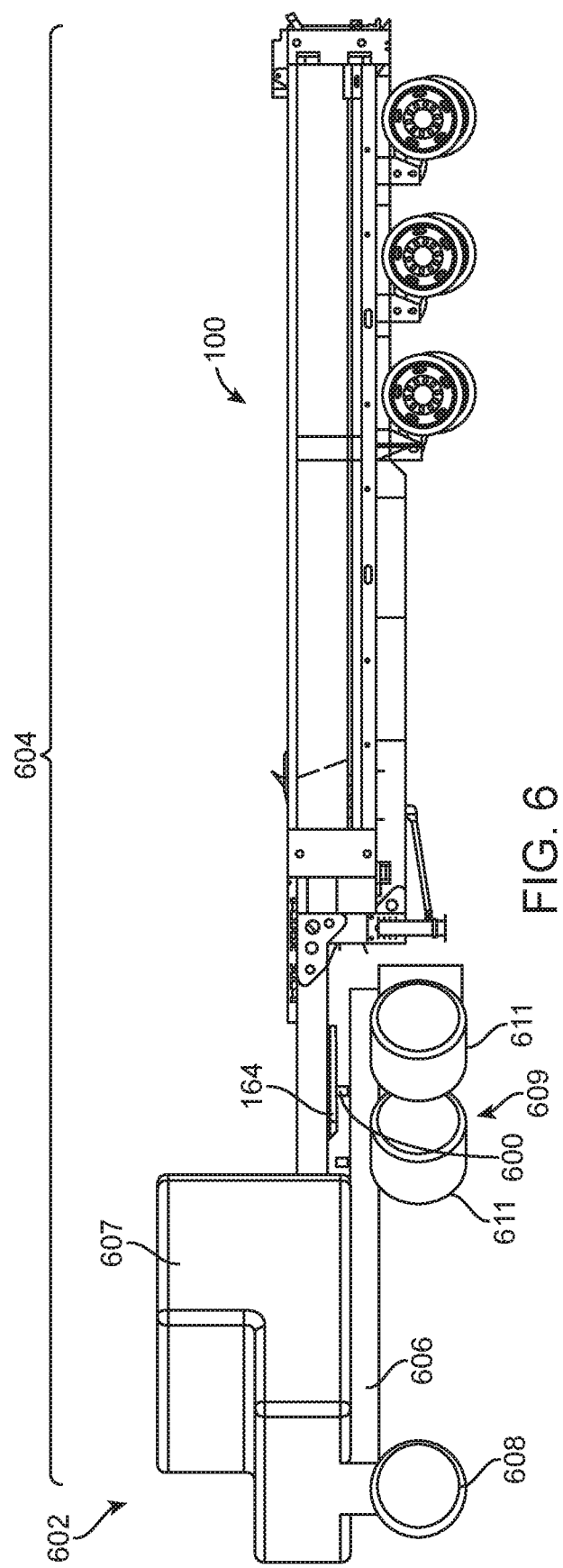
FIG. 6 is a schematic side elevational view of the dump trailer of FIG. 1 connected to a tractor truck for purposes of hauling cargo.

FIG. 6 shows the ejector-dump trailer 100 with the fifth wheel connector 164 engaging a fifth wheel coupling 600, or other suitable coupling mechanism, that is mounted at the rear of a tractor unit or truck 602 of any suitable type. Tractor unit 602 can include a frame 606 carrying a cab 607 for housing the driver. Steerable front wheels 608 are rotatably carried by the front of frame 606 and at least one rear wheel and axle assembly 609 is rotatably carried by the rear of frame 606. The rear wheel and axle assembly 609 can include left and right wheels 611. The assembled tractor-trailer unit 604 is, accordingly, made ready for over-the-road hauling, for example on an outdoor transportation network.

Figure 7:
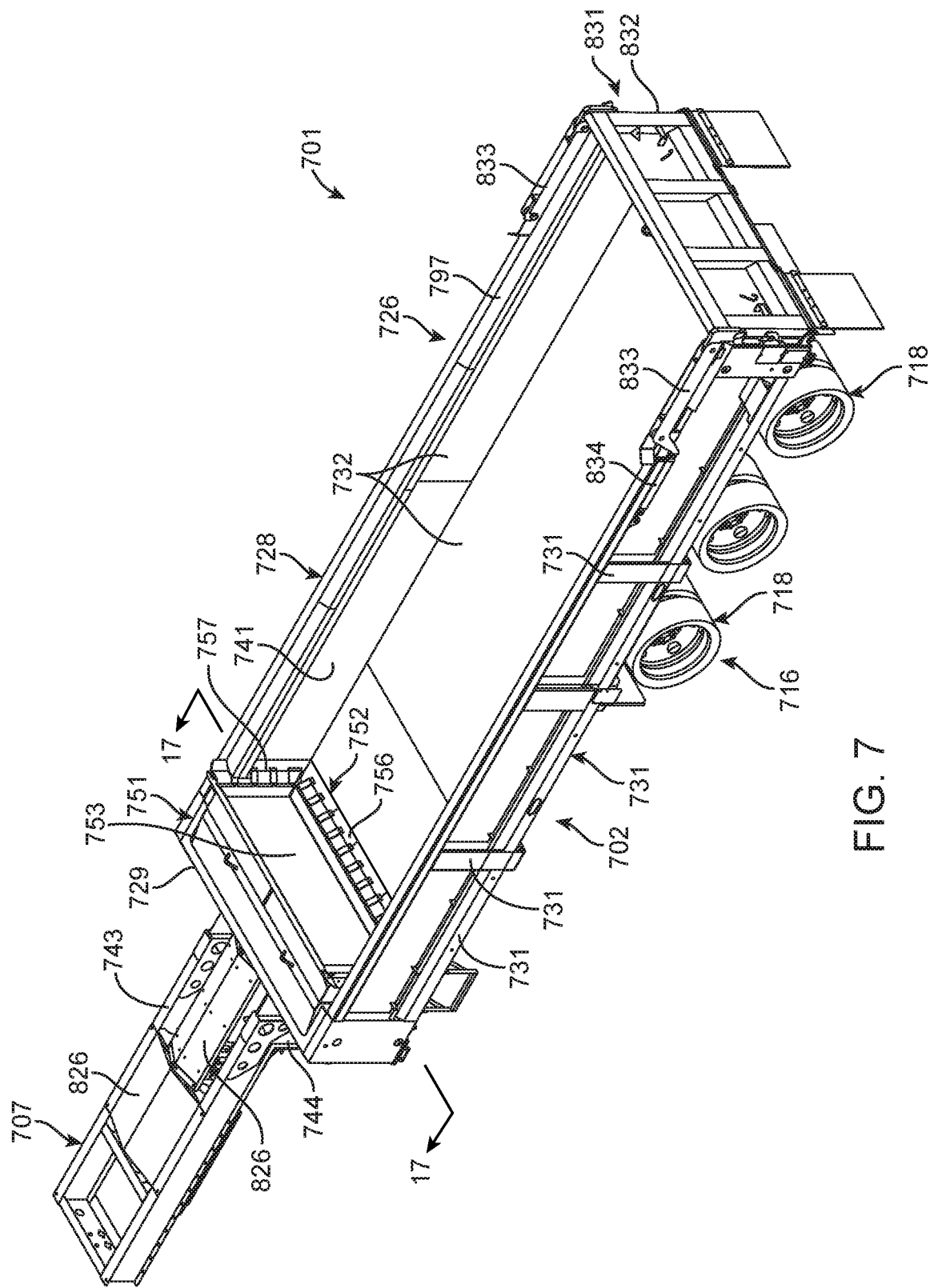
FIG. 7 is a back isometric view of another embodiment of the dump trailer of the invention.
Figure 15:
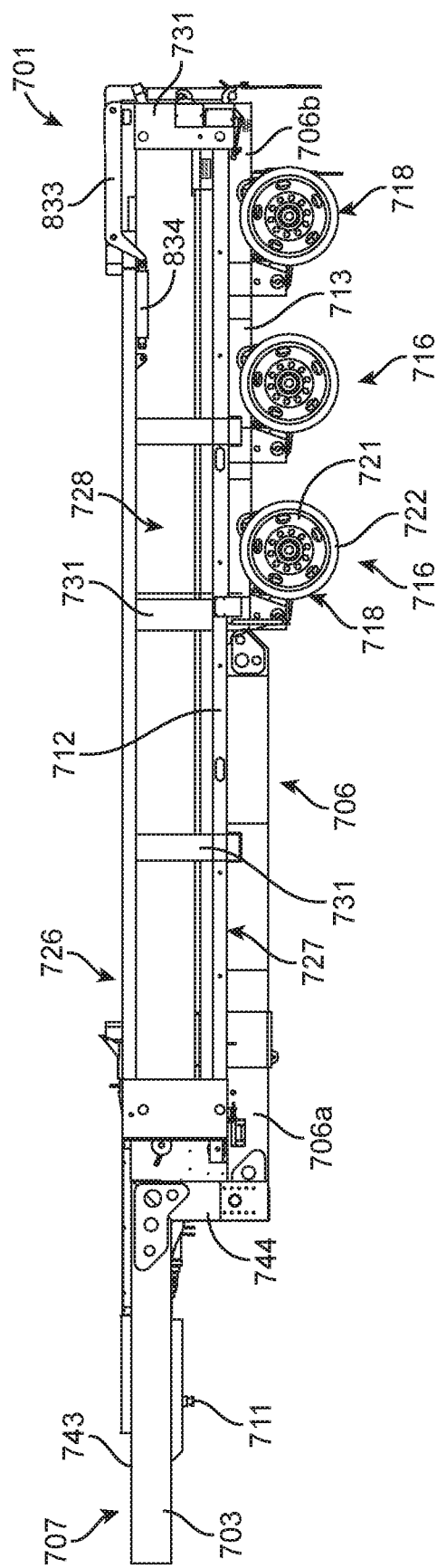
FIG. 15 is a left side elevational view of the dump trailer of FIG. 7 taken along the line 15-15 of FIG. 14.
Figure 16:
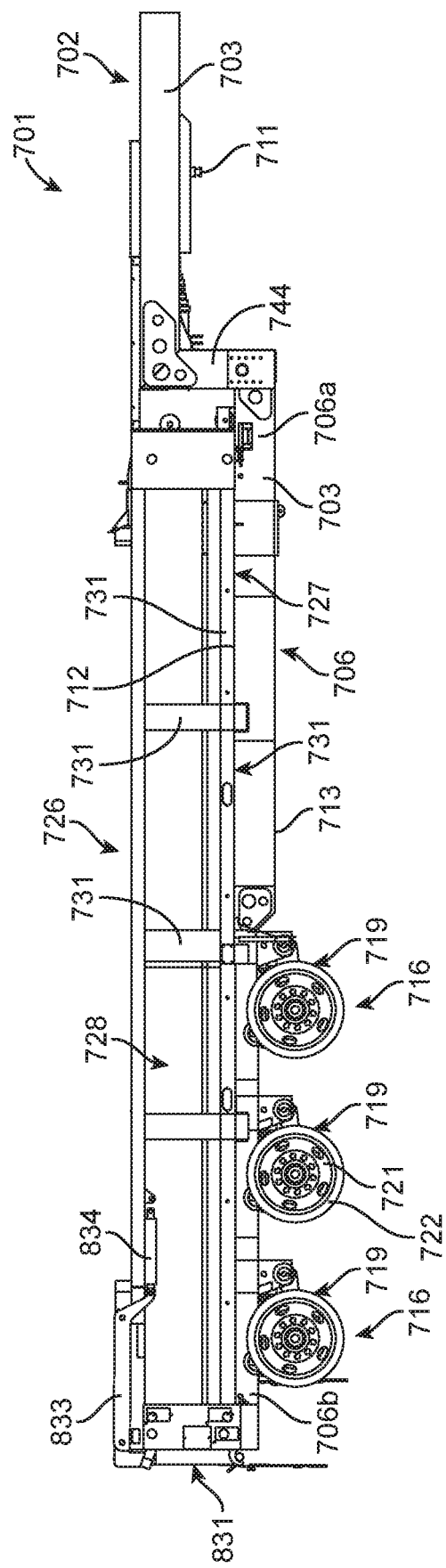
FIG. 16 is a right side elevational view of the dump trailer of FIG. 7 taken along the line 16-16 of FIG. 14.
Figure 17:
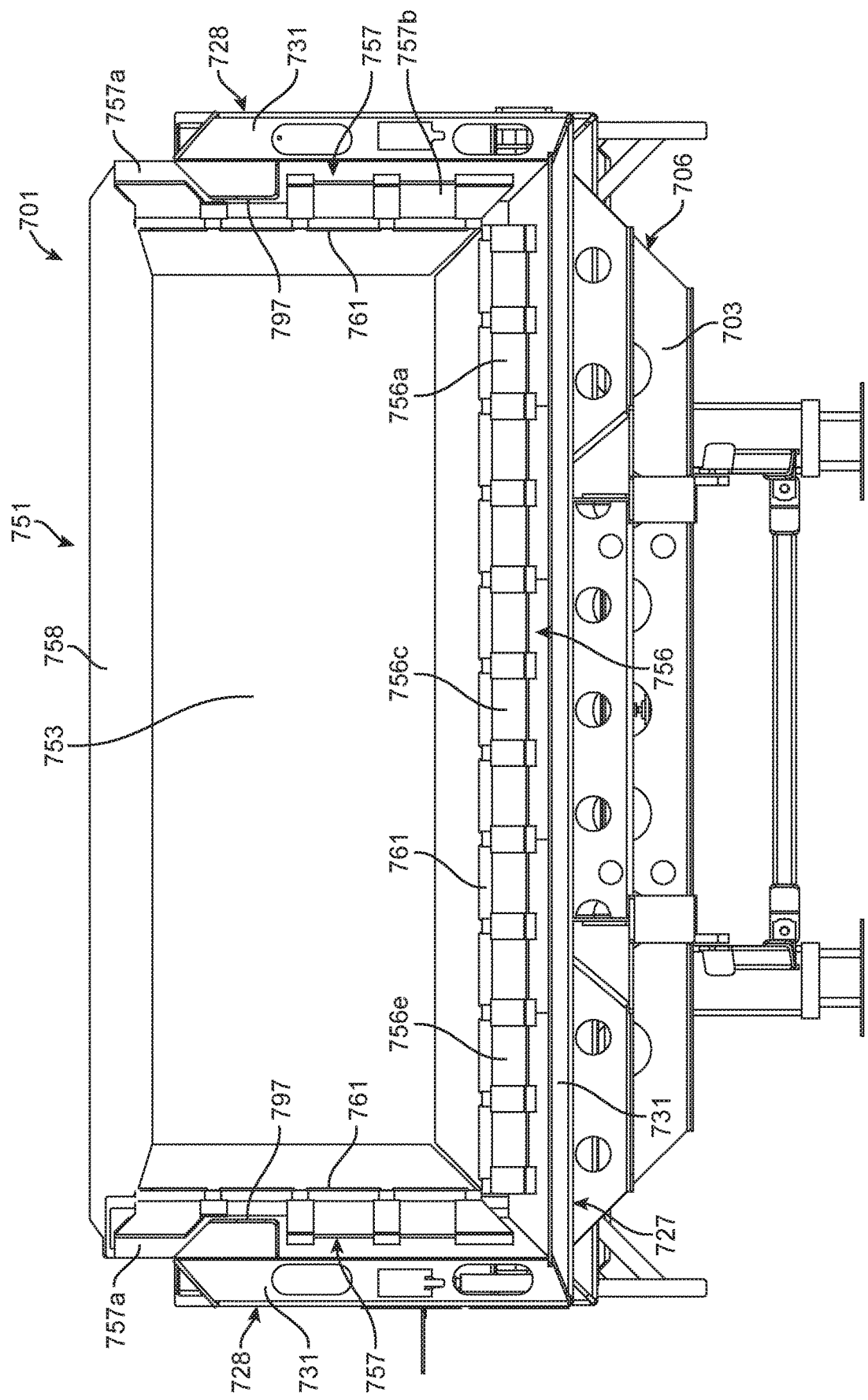
FIG. 17 is a cross-sectional view of the dump trailer of FIG. 7 taken along the line 17-17 of FIG. 7.

An optional embodiment of the dump trailer of the invention is shown in FIGS. 7-36. Dump trailer 701 shown therein includes a high-strength frame 702 made from steel or any other suitable high-strength material. For example, the frame 702 can be formed from a plurality of members 703, each made for example from steel, joined together to form a framework (see FIGS. 7, 11 and 15). Frame 702 includes a main portion 706 and an extension 707 joined to the main portion and extending forwardly of the main portion. The extension 707, which can be referred to as a gooseneck, includes a coupling mechanism 711, such as a fifth wheel coupling mechanism, on its underside for removably coupling the trailer 701 to a complementary coupling mechanism provided on a tractor unit, for example coupling mechanism 600 of tractor unit 602. Main portion 706, which can optionally be planar, has a front 706*a* and a rear 706*b* and a top 712 and a bottom 713.

A plurality of trailer wheel and axle assemblies 716 are joined to the bottom 713 of frame main portion 706 at its rear 706*b* by any suitable means, for example suspension and swingarm assemblies 715. Each of the assemblies 716 can be of any suitable type and of any suitable number. Dump trailer 701 is shown with three wheel and axle assemblies 716 longitudinally spaced apart along the bottom 713 of frame main portion 706. Each of the axle and wheel assemblies 716 includes a transverse axle 717 and at least one left wheel 718 and at least one right wheel 719. Each of the assemblies 716 can optionally include a plurality, such as two, left wheels 718 and a plurality, such as two, right wheels 719. Each of the wheels 718,719 includes a rim 721 and a tire 722 extending around the rim suitable for highway travel. It is appreciated that the number of wheels in each axle and wheel assembly 716, and on trailer 701 is a function of a number of factors, including the load capacity of the trailer and the size of the tires.

The left and right wheels 718,719 of the trailer wheel and axle assemblies 716 can be of any suitable size. Wheels 718, 719 to optionally be smaller in diameter, size or both than rear wheels 611 of tractor unit 602. For example, wheels 718, 719 can each optionally have a new tire diameter that is any suitable percentage of the new tire diameter of the left and right rear wheels 611 of the tractor unit 602, for example 68%, 75%, 80%, 83% or 100% of the new tire diameter of the left and right rear wheels 611 of the tractor unit 602. Wheels 718, 719 can optionally have a new tire diameter ranging from 29 to 44 inches. Wheels 718, 719 can optionally have a new tire diameter of 30 inches.

Each of the axle and wheel assembly 716 optionally includes a mechanism, such as at least one airbag (not shown), for example mounted between frame main portion 706 and the suspension assembly, for adjusting the height of the frame main portion 706 relative to the assembly 716, and thus the wheels of the assembly. A plurality of brake chambers 723 are optionally included in dump trailer 701 for assisting in the braking of the trailer.

Dump trailer 701 as an open bed 726 joined to top 712 of frame main portion 706 for receiving the cargo to be carried by the trailer. Bed 726 can optionally extend the entire length of frame main portion 706, for example between the front end and the rear end of the frame portion 706, and optionally the entire width of frame main portion 706, for example between the opposite left and right sides of the frame portion. Bed 726 can be of any suitable configuration and shape, for example rectangular in cross-section or semicircular in cross-section. The open bed 726 can be joined or secured to frame main portion 706 by any suitable means. Optionally, open bed 726 is made from metal or any other suitable material and is a box bed formed from a bottom wall 727 secured to top 712 of frame main portion 706, left and right side walls 728 extending upwardly from opposite sides of the bottom wall 727 and a front wall 729 extending upwardly from the front end of bottom wall 727 and between the front end of side walls 728. Each of the walls of the open bed 726 are optionally formed from a plurality of rigid frame members 731 joined together to form a rigid framework for the respective wall. For example, bottom wall 727 includes a plurality of frame members 731 extending transversely to the top 712 of frame main portion 706, each of the side walls 728 includes a plurality of frame members 731 extend upwardly along each of the opposite sides of bottom wall 727 and the front wall 729 includes a plurality of frame members 731 extending upwardly from the front end of the bottom wall 727. One or more layers 732 of any suitable rigid material such as steel or another metal forms the inside of open bed 726, including on the inside of each of left and right sidewalls 728 and front wall 729 and the top of bottom wall 727. Sidewalls 728, front wall 729 and bottom wall 727 form an open space or cargo area 741 of the bed. The cargo area 741 communicates with an opening 742 at the back or rear of the open bed 726.

Open bed 726 of the dump trailer 701 can have any suitable top height, that is relative to the ground or other support surface on which the trailer 701 is resting. In this regard, the top of open bed 726, for example the top of sides walls 728 and front wall 729 of the bed 726, can optionally be between five and six feet, 5.25 feet (63 inches), 5.50 feet (66 inches), 5.67 feet (68 inches), 6.00 feet (72 inches) or 7.00 feet (84 inches) above the ground. Open bed 726 can have any suitable bottom height. The bottom height of the open bed, for example the height of the inside of bottom wall 727 of the bed 726, can optionally range from 31 to 36 inches above the ground.

The length of open bed 726 relative to the top height of the open bed 726 can be any suitable ratio. For example, open bed 726 can optionally have a length to height ratio of 9:1, 9.375:1, 9.6:1, 11.25:1, ranging from 9:1 to 9:4 or ranging from 9:1 to 11.25:1.

The bottom of open bed 726 can be positioned above left and right wheels 718, 719 of trailer wheel and axle assemblies 716 by any suitable distance. The example, left and right wheels 718, 719 can optionally be spaced below the bottom of bottom wall 727 a distance of 0.25 inch, 6.0 inch or ranging from 0.25 to 6.0 inches.

The load capacity in cubic yards at water level of open bed 726 relative to the top height in feet of the open bed can be any suitable ratio. For example, open bed 726 can optionally have a load capacity to height ratio of 5:8:1, 7:1, 8.6:1 or ranging from 7:1 to 8.6:1. Dump trailer 701 can optionally have a maximum achievable payload exceeding 45,000 pounds when the top height of the open bed 726 is between five to six feet above the ground.

At least a portion of open bed 726 can optionally extend below forward extension 707 of frame 702. In this regard, top 712 of frame main portion 706 can be disposed vertically below top 743 of forward extension 707. Such a frame 702, which can be referred to as a dropped frame, can optionally include an upstanding portion 744 extending upwardly at front end of frame portion 706 for joining the front 706a of frame main portion 706 to the rear of forward extension 707. Upstanding portion 744 can optionally be formed from a plurality of frame members 703 and can optionally be substantially vertical so that front wall 728 of open bed 726 seats substantially flush with the upstanding portion 744.

Dump trailer 701 can optionally be referred to as a low-profile dump trailer or a dropped frame dump trailer. When frame 702 is a dropped frame, at least a portion of open bed 726 can optionally extend at a height below the height of forward extension 707. The entire open bed 726 can optionally be lower than the forward extension 707. At least 95% of open bed 726 can optionally be lower than forward extension 707. At least 80% of open bed 726 can optionally be lower than forward extension 707. At least 75% of open bed 726 can optionally be lower than forward extension 707. At least 50% of open bed 726 can optionally be lower than forward extension 707. At least 33% of open bed 726 can optionally be lower than forward extension 707. Open bed 726 can optionally have a top height above ground, or other surface on which dump trailer 701 is resting, approximating the height of forward 707 extension.

Dump trailer 701 can include a dump mechanism 751 for emptying the contents of open bed 726. The dump mechanism can be of any suitable type and can optionally include a blade, for example blade 752, movable within open bed 26 towards rear opening 742 for emptying the contents or cargo within the open bed. Blade 752 can be made from any suitable rigid material such as metal. The blade can optionally be slidably or movably disposed within open bed 726, for example along sidewalls 727 and bottom wall 731, from a first position away from rear opening 742 to a second position closer to the rear opening. They dump mechanism 751 can be referred to as an ejecting mechanism or ejector.

Blade 752 can optionally include a central portion 753 closely approximating the cross-sectional shape and dimensions of open bed 726. The central portion 753 can optionally be planar or concave towards rear opening 742. Blade 752 can optionally include a bottom portion 756 inclined or inclinable forwardly of central portion 753 for engaging the bottom of open bed 726 and first and second side portions 757 inclined or inclinable forwardly of central portion 753 for engaging the sides of open bed 726. Blade 752 can optionally include a top portion 758, which can be referred to as a deflector, inclined forwardly of central portion 753.

Bottom portion 756 can optionally be pivotable relative to blade central portion 753 from a first position in engagement with bottom wall 753 and a second position spaced away from the bottom wall. The bottom portion 756 can be pivotably coupled to blade central portion 753 by one or more pivots 761, which are example can be hinges. Each of first and second side portions 757 can optionally be pivotable relative to blade central portion 753 from a first position in engagement with the respective sidewall 727 and a second position spaced away from the respective sidewall. Each of the first and second side portion 757 can be pivotably coupled to blade central portion 753 by one or more pivots 761.

Bottom portion 756 can optionally be segmented, for example formed from a plurality of blade segments spaced apart along the length of the blade portion. For example, bottom portion 756 can be formed from a first blade segment and 756a, a second blade segment 756b, a third blade segment 756c, a fourth blade segment 756d and a fifth blade segment 756e sequentially spaced along the length of the blade portion 756. The blade segments 756a-e are optionally pivotal with respect to each other relative to central portion 753 of the blade 752. With respect to each adjacent set of blade segments, at least one of the adjacent blade segments can optionally include a side extension 762 that extends over the side of the other adjoining blade segment for inhibiting cargo within open bed 726 from passing between the blade segments. In this regard, for example third or central blade segment 756c can have a side extension 762 along each side thereof, one for overlapping the side of adjacent second blade segment 756b and the other for overlapping the side of fourth blade segment 756d. Similarly, second leg segment 756 be can have a side extension 762 along its side adjacent first blade segment 756a for overlapping the first blade segment and fourth leg segment 756d can have a side extension 762 along its side adjacent fifth blade segment 756e for overlapping the fifth blade segment. Side extensions 762 result in the pivoting of one blade segment having a portion underlying a side extension of an adjacent blade segment causing the adjacent blade segment to pivot in unison with the one blade segment. For example, pivoting of second blade segment 756b results in third blade segment 756c pivoting in unison with the second blade segment. Pivoting of first blade segment 756a results in both second blade segment 756b and third blade segment 756c pivoting in unison with the first blade segment.

Each of the side portions 757 can optionally be segmented, for example formed from a plurality of blade segments spaced apart along the length of the side blade portion. For example, each side portion 757 can be formed from a first or upper blade segment 757a and a second or lower blade segment 757b below the first blade segment. The blade segments 757a-b are optionally pivotal with respect to each other relative to central portion 753 of the blade 752. At least one of the first or second blade segments can optionally include a side extension 762 that extends over the side of the other blade segment for inhibiting cargo within open bed 726 from passing between the blade segments. For example, first blade segment 757a can have a side extension 762 along the side thereof adjacent second blade segment 757b for overlapping the side of second blade segment. The side extension 762 result in the pivoting of the second blade segment causing the first blade segment to pivot in unison with the second blade segment. First blade segment 757a can pivot independently of a second blade segment 757b.

Blade 752 can optionally rollably engage bottom wall 731 of the open bed 726. In this regard, for example, the blade 752 can be carried by or secured to a carriage or rollable support 766, for example to the front of the rollable support 766. A plurality of rollers 767 can be provided on the bottom of the rollable support for engaging the bottom wall 731 so as to permit the support 766, and blade 752 carried thereby, to roll forwardly and rearwardly along the length of the open bed 726.

Dump mechanism 751 can optionally include a wiper 781, which can be referred to as a bottom wiper, behind bottom portion 756 of the blade 752 for pushing any cargo that passes the blade portion 756 out of the open bed 726. Wiper 781 can be formed from any suitable material such as hard rubber and can have an engaging edge 781*a* contoured to bottom wall 731 for enhancing the effectiveness of the wiper. Wiper 781 can be spaced behind blade bottom portion 756 by any suitable distance and secured to rollable sport 766 by any suitable means, for example one or more brackets 782.

Dump mechanism 751 can optionally include a wiper 786, which can be referred to as a side wiper, behind each side portion 757 of the blade 752 for pushing any cargo that passes the blade portion 757 out of the open bed 726. Each wiper 786 can be formed from any suitable material such as hard rubber and can have an engaging edge 786*a* contoured to the respective side wall 727 for enhancing the effectiveness of the wiper. Each wiper 786 can be spaced behind the respective side bottom portion 757 by any suitable distance and secured to rollable sport 766 by any suitable means, for example one or more brackets 787.

Figure 18:
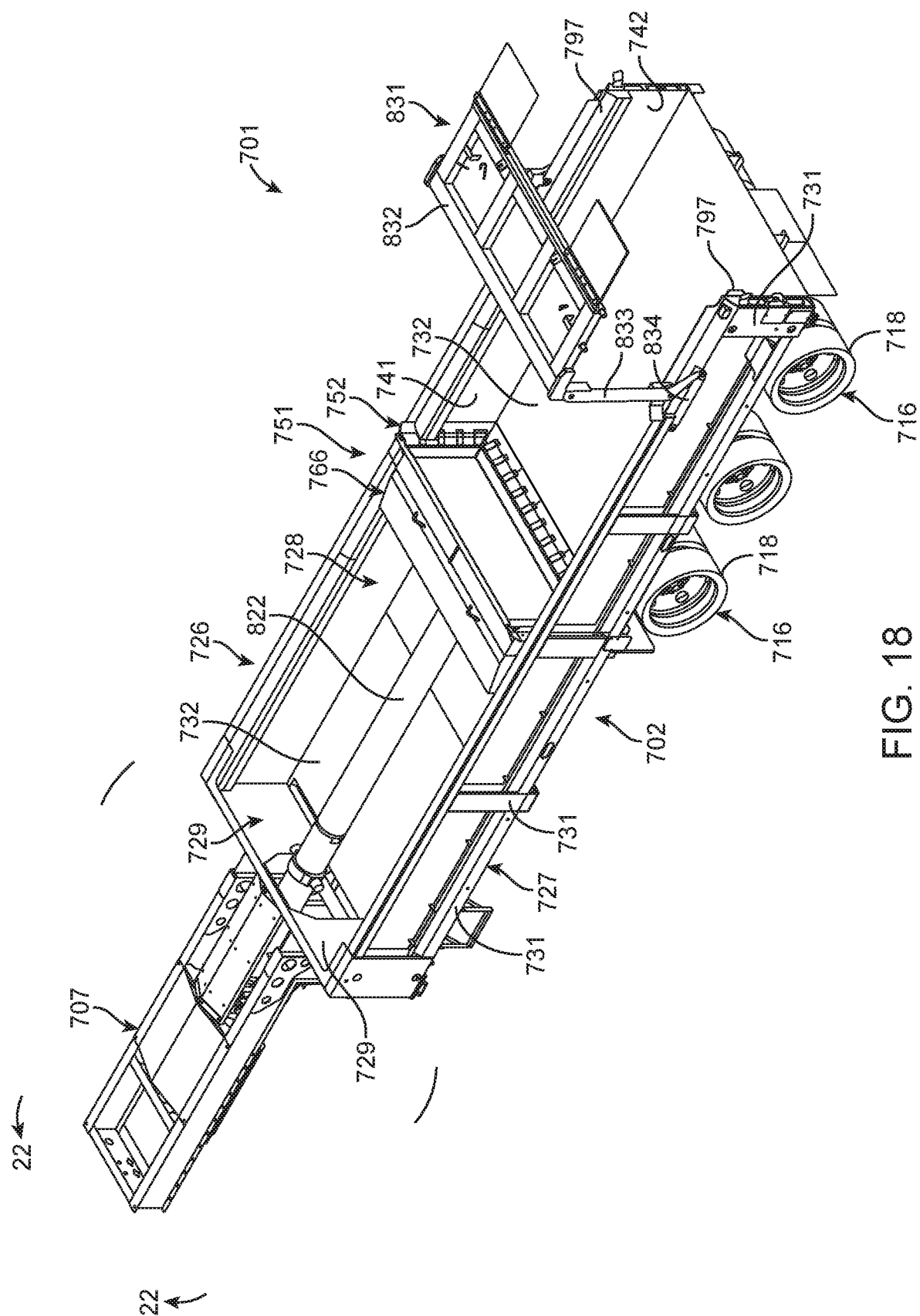
FIG. 18 is a back isometric view of the dump trailer of FIG. 7, similar to FIG. 7, with the ejector in a second position within the bed of the dump trailer.
Figure 19:
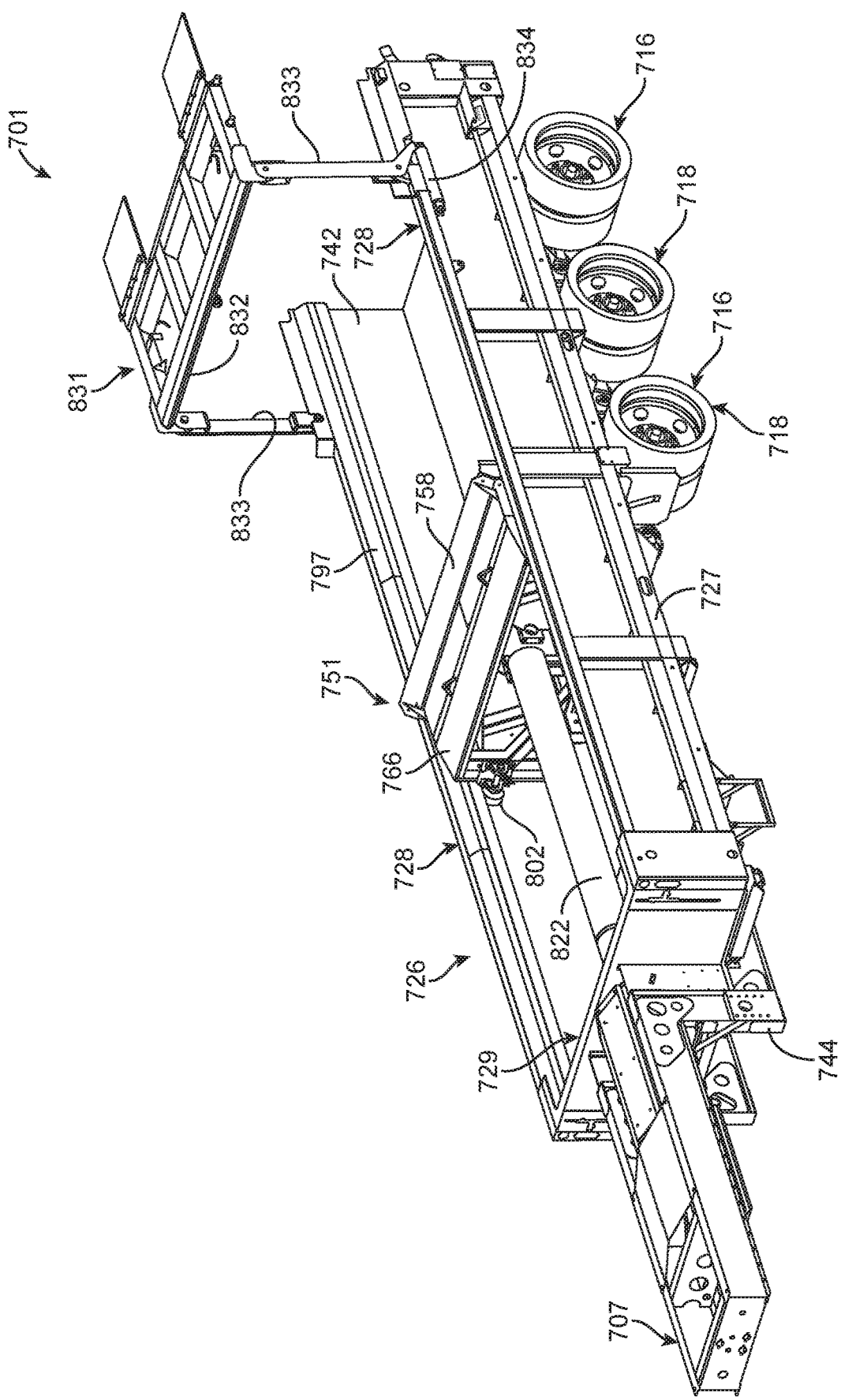
FIG. 19 is a front isometric view of the dump trailer of FIG. 7, similar to FIG. 9, with the ejector in a second position of FIG. 18 within the bed of the dump trailer.
Figure 20:
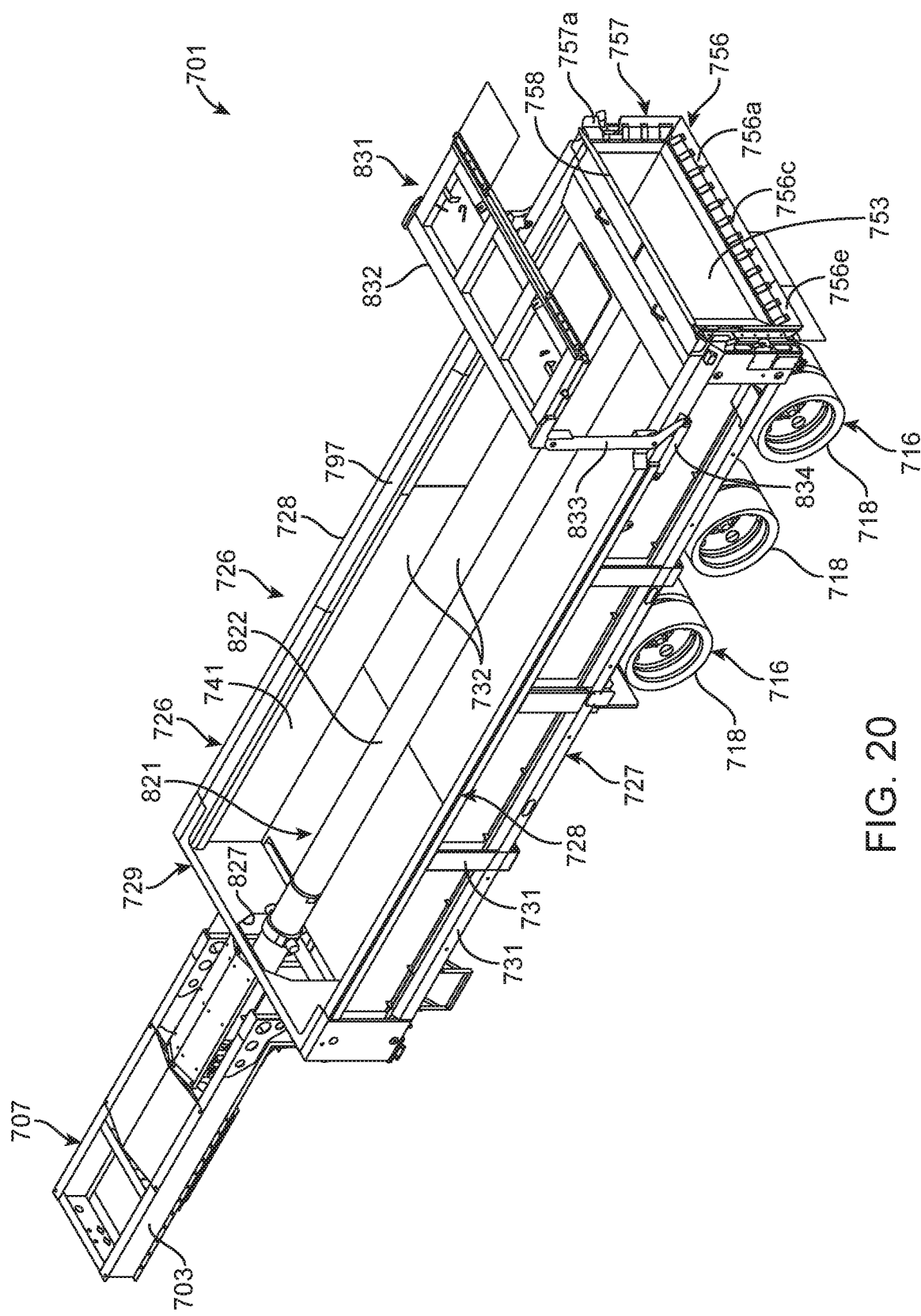
FIG. 20 is a back isometric view of the dump trailer of FIG. 7, similar to FIG. 7, with the ejector in a third position within the bed of the dump trailer.
Figure 21:
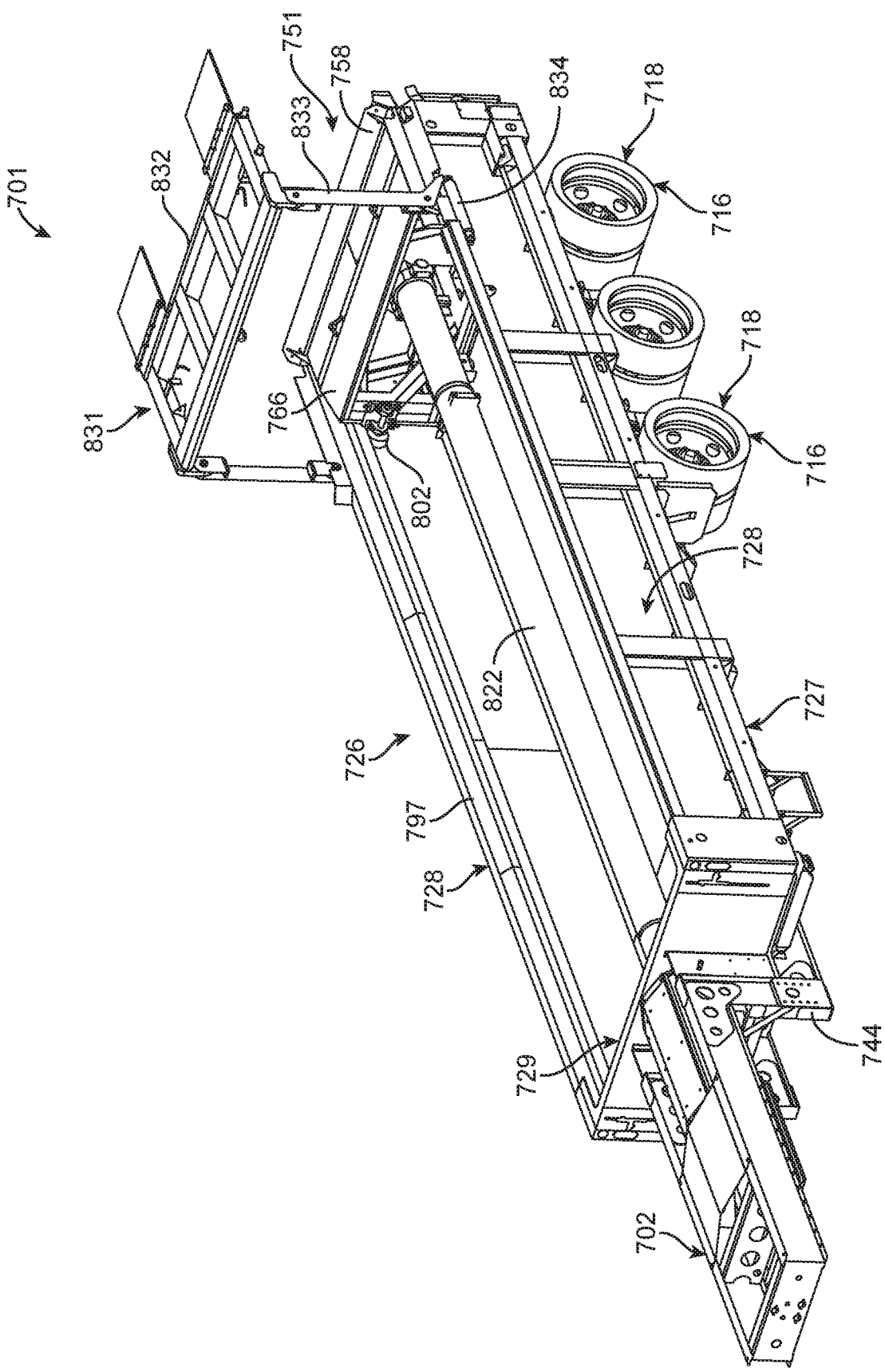
FIG. 21 is a front isometric view of the dump trailer of FIG. 7, similar to FIG. 9, with the ejector in a third position of FIG. 20 within the bed of the dump trailer.
Figure 22:
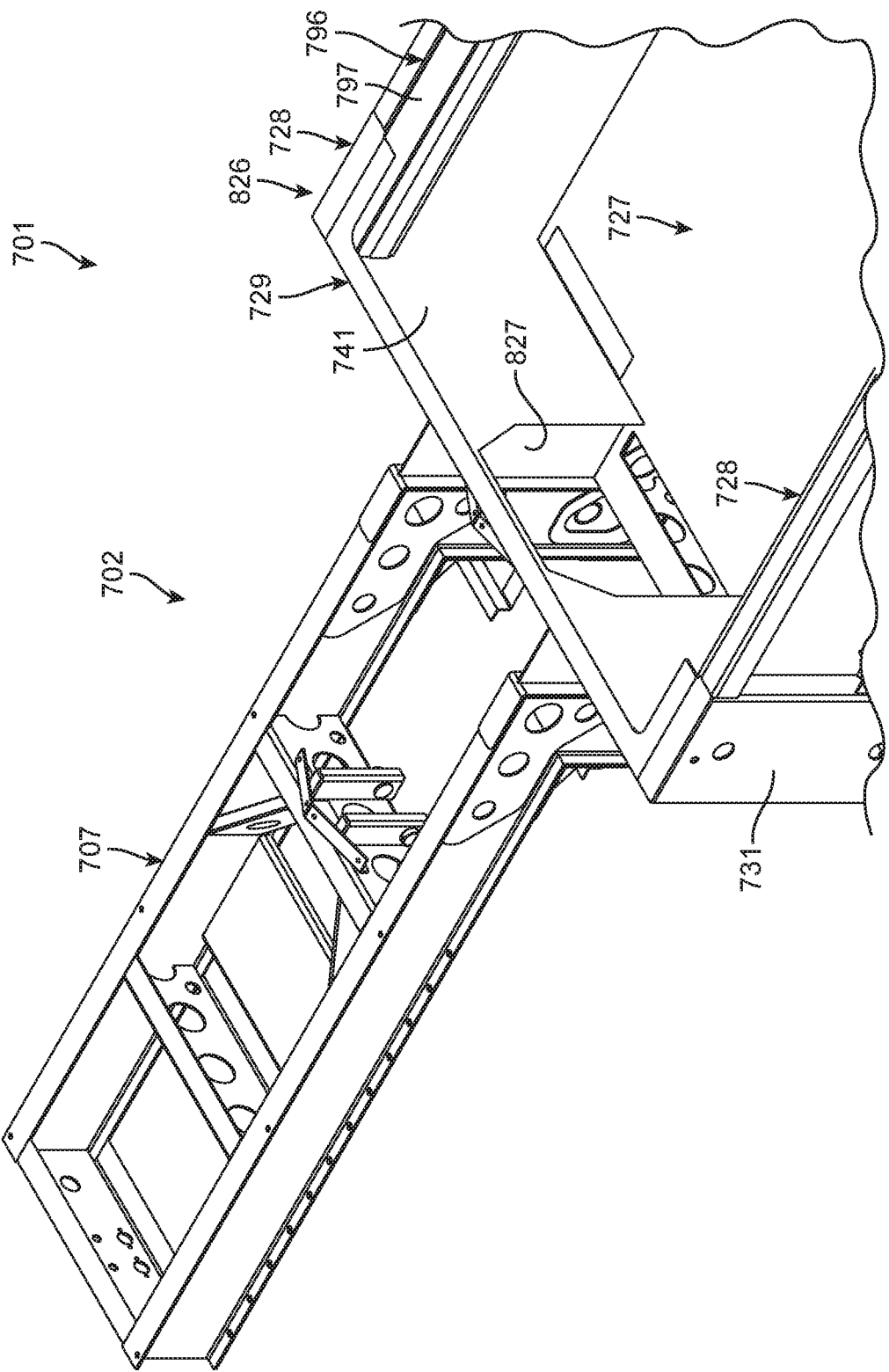
FIG. 22 is an enlarged isometric view of a portion of the dump trailer of FIG. 7, taken along the line 22-22 of FIG. 18, with the cover plates removed from the gooseneck and the ejector and ejector actuator removed from the dump trailer.

Blade 752 can optionally be slidably, rollable or otherwise movably disposed within open bed 726, for example along sidewalls 727 and bottom wall 731, from a first position away from rear opening 742 to a second position closer to the rear opening. The first position can include the position where blade 752 is fully retracted within open bed 726, for example in a position adjacent front wall 729 as illustrated in FIGS. 7-10. The first position can also include a position where the blade 752 is between front wall 729 and rear opening 742, as illustrated in FIGS. 18-19 where the blade 752 is approximately halfway between front wall 729 and rear opening 742. The second position can include a position where the blade 752 is fully extended within the open bed 726, for example at rear opening 742 as illustrated in FIGS. 20-21. The second position can also include a position with the blade 752 is between front wall 729 and rear opening 742, as illustrated in FIGS. 18-19.

Open bed 726 can include a guide member or mechanism 796 for guiding the blade 752 along the length of open bed 726 between its first and second positions, retaining blade bottom portion 756 and blade side portions 757 in respect of engagement with bottom wall 727 and side walls 728 during travel of the blade towards rear opening 742, properly positioning the blade 752 within the open bed 726 as the blade travels between its first and second positions, inhibiting the blade 752 from lifting off bottom wall 727 as it pushes cargo out rear opening 742 or any combination of the foregoing. Guide mechanism 796 can include a guide rail 797 affixed to each side wall 727 and extending along the length of the sidewall. The guide rails 797 optionally oppose each other within open bed 726. Each guide rail 77 can be made from any suitable material such as metal.

Rollable support 766 optionally includes a cooperating guide element 801 for engaging each guide rail 797 so as to retain the rollable support 766 in a desired position within open bed 726 as the blade 752 travels between its first and second positions. In this regard, for example, the rollable support 766 can include a roller 802 provided on each side thereof for rollably engaging the underside of the respective guide rail 797. Each roller 802 can be mounted to the side of rollable support 766 by any suitable means such as a bracket 803. Each bracket 803 can include any suitable adjustment assembly or mechanism 806 for properly positioning the respective roller 802 relative to the rollable support 766 and the respective guide mechanism 796. Each adjustment mechanism 806 can optionally include one or more adjustment screws 807.

Each of blade side portions 757 optionally includes a cutout 811 for accommodating or receiving the respective guide rail 797. Each cutout 812 in a blade side portion 757 closely contours the shape of the respective guide rail 797 so as to inhibit cargo in the open bed 726 from passing the blade portion. Each side wiper 786 optionally includes a cutout 812 for accommodating or receiving the respective guide rail 797. Each cutout 812 in a side wiper 786 closely contours the shape of the respective guide rail 797, and optionally engages the guide rail, so as to inhibit cargo in the open bed 726 from passing the wiper 786.

Front wall 729 of the open bed 726 optionally includes one or more holes are openings therein (not shown) for receiving the guide elements 801 carried by rollable sport 766 for permitting the dump mechanism 751 to closely engage or sit flush with the front wall 729 when the blade 752 is in its fully retracted position within the open bed.

Figure 23:
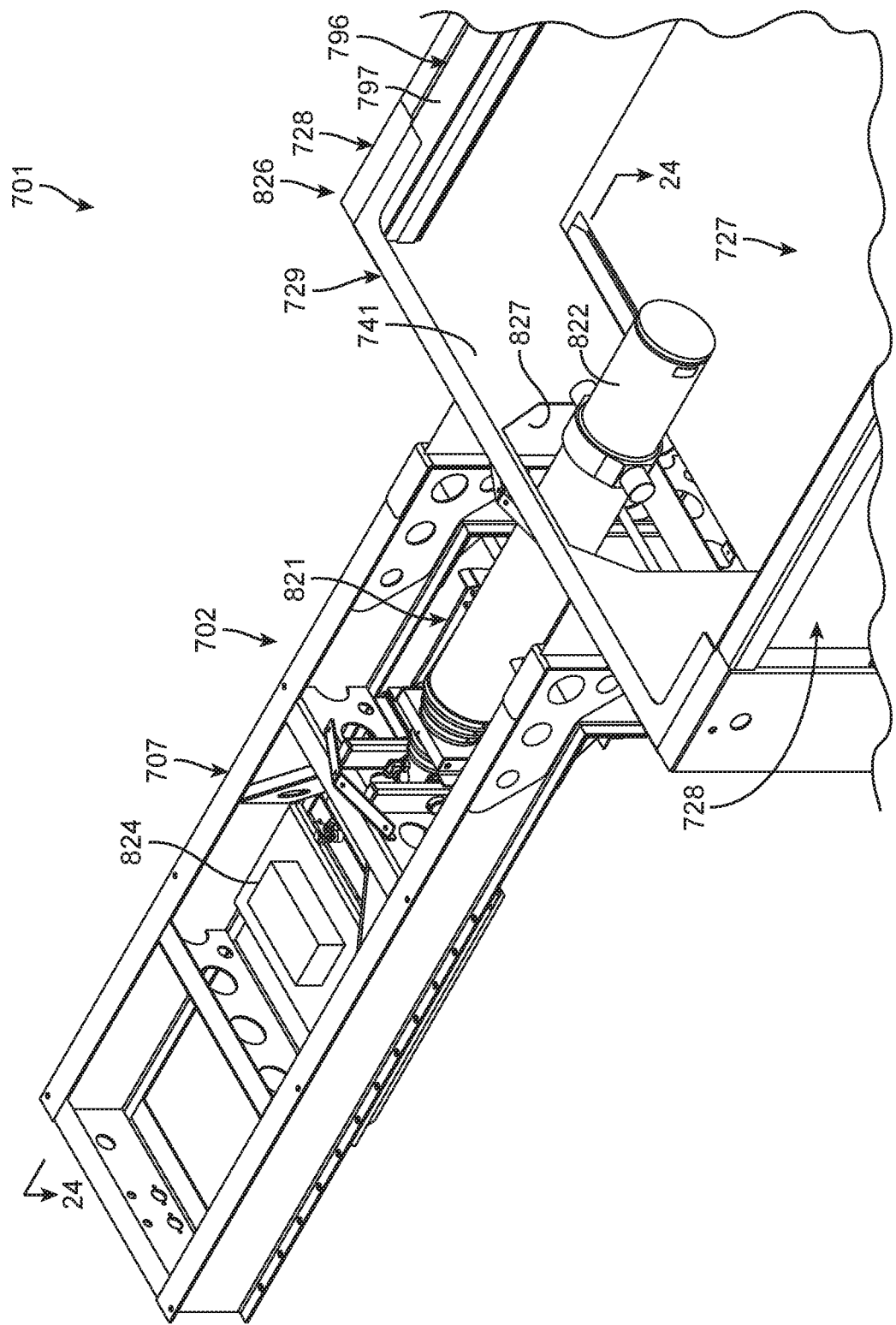
FIG. 23 is an enlarged isometric view of a portion of the dump trailer of FIG. 7, similar to FIG. 22, with the cover plates removed from the gooseneck to reveal the ejector actuator.
Figure 24:
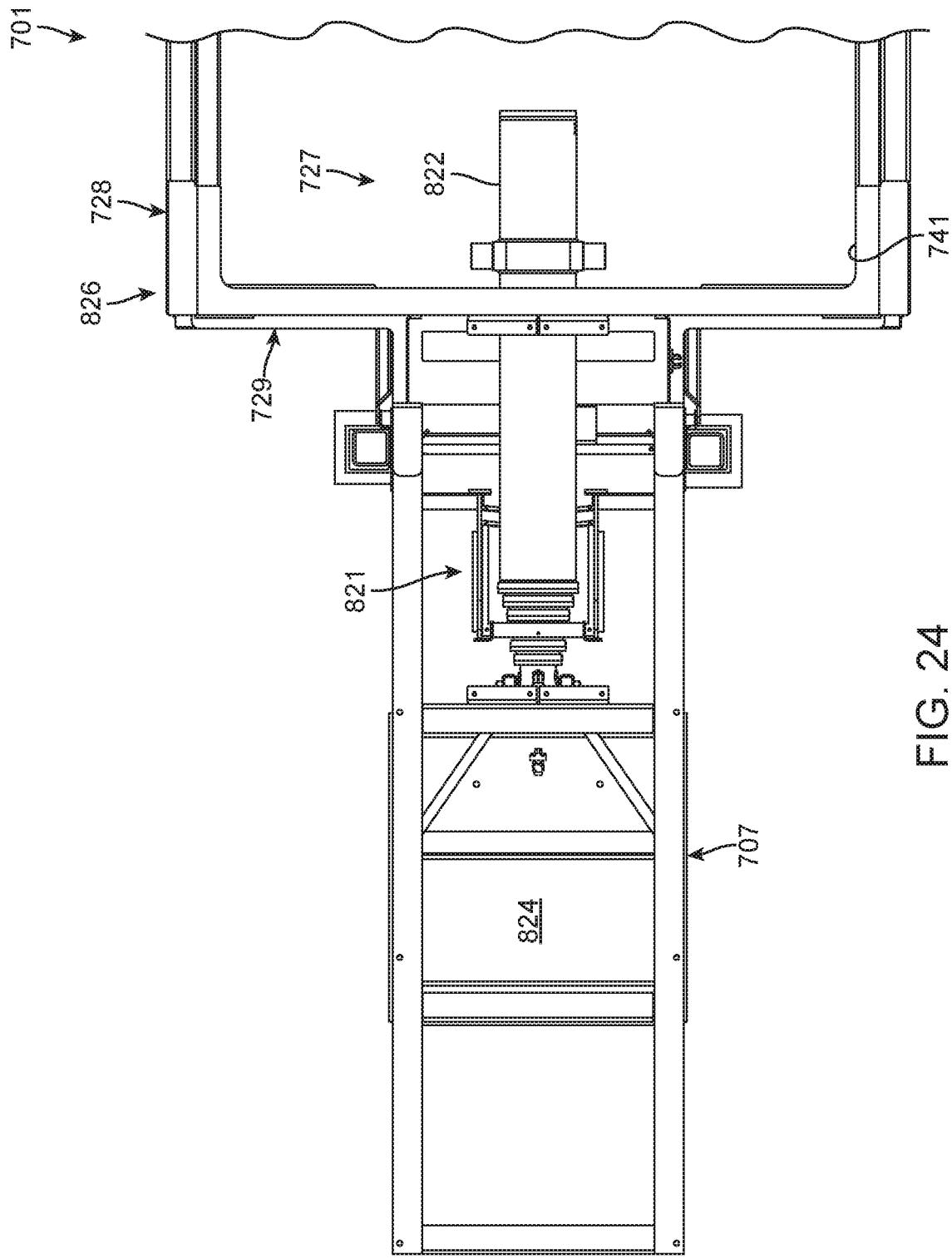
FIG. 24 is a top plan view of the portion of the dump trailer of FIG. 23 taken along the line 24-24 of FIG. 23.
Figure 25:
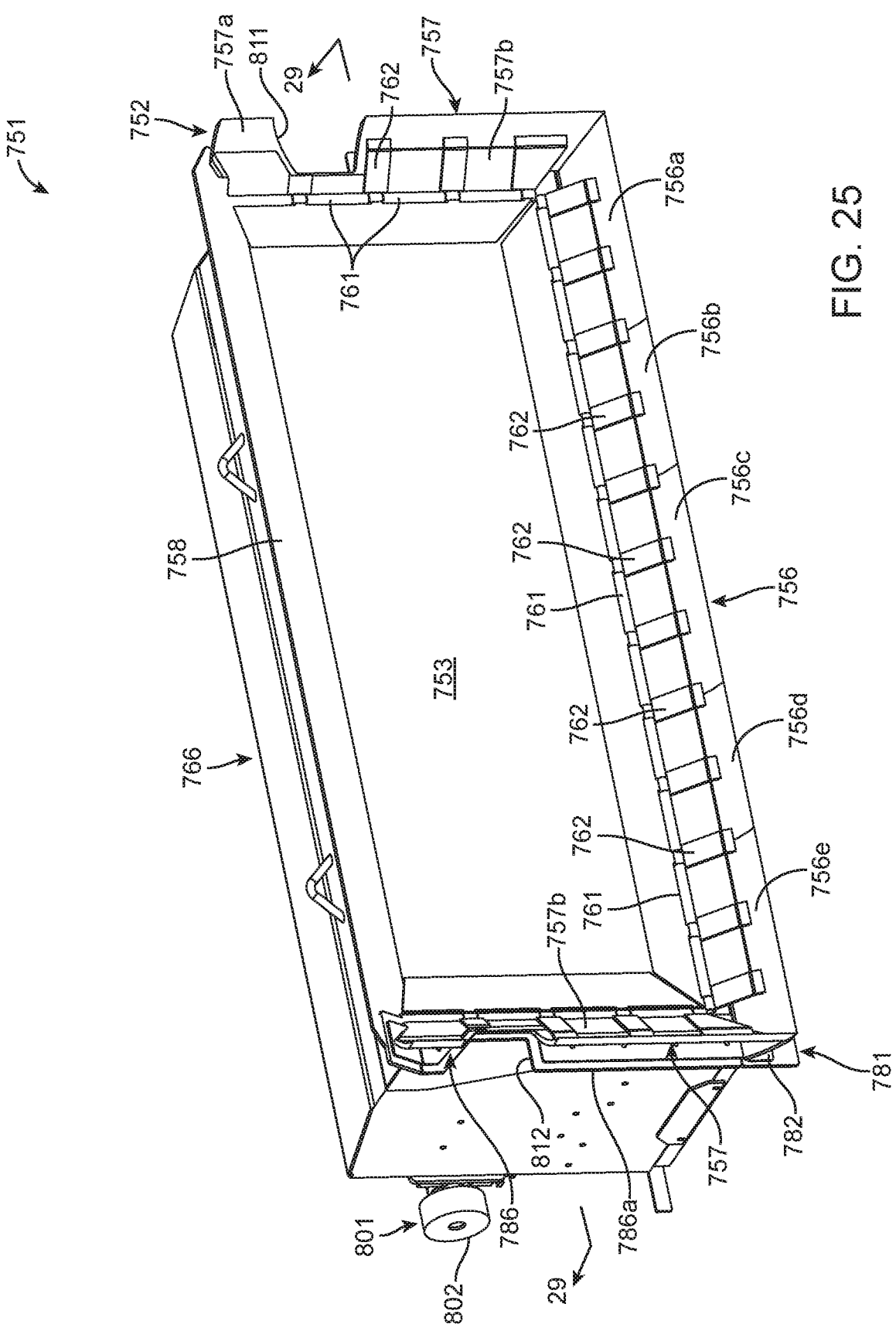
FIG. 25 is a top, front isometric view of the ejector of the dump trailer of FIG. 7, removed from the bed of the dump trailer.
Figure 26:
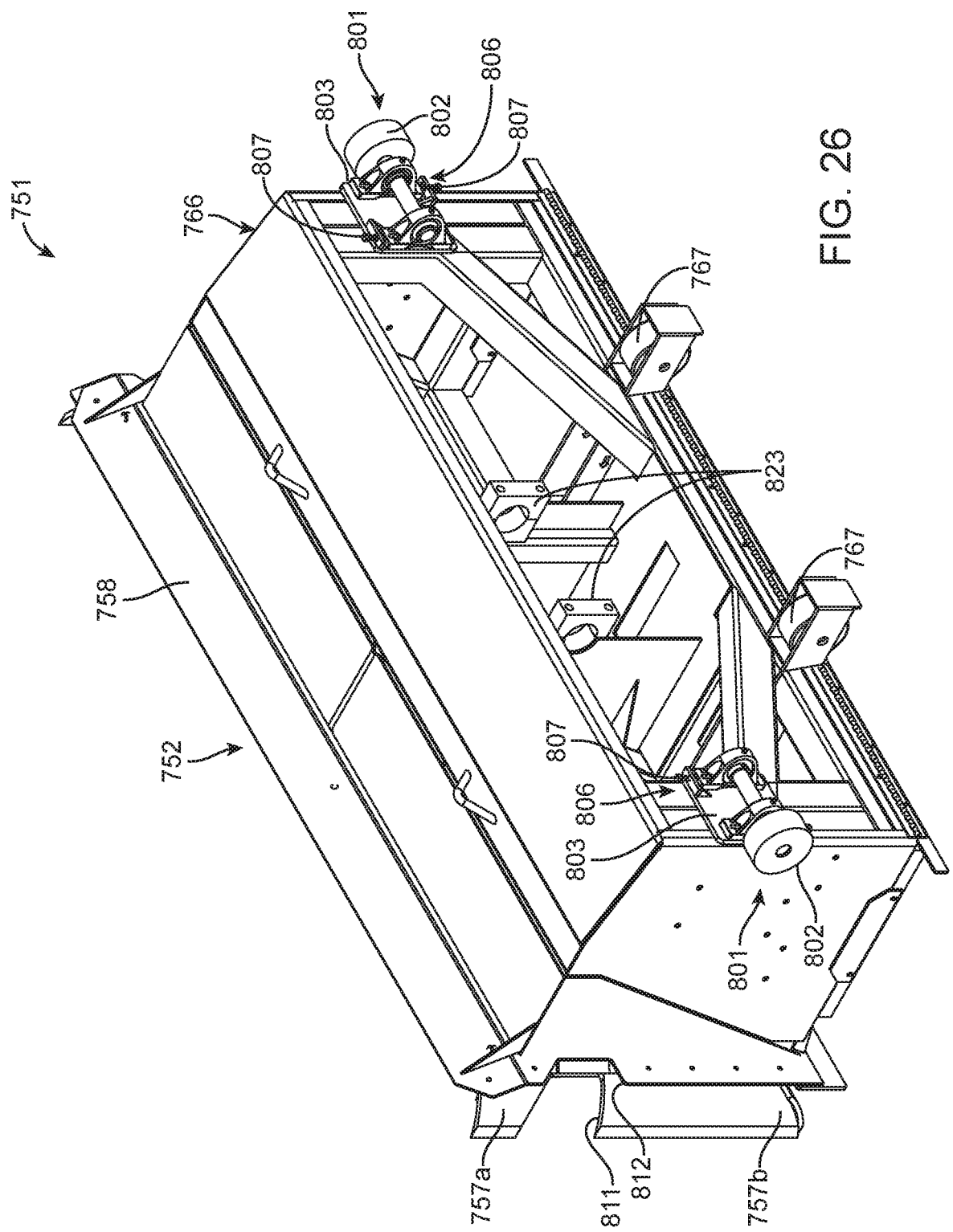
FIG. 26 is a top, back isometric view of the ejector of the dump trailer of FIG. 7, removed from the bed of the dump trailer.
Figure 27:
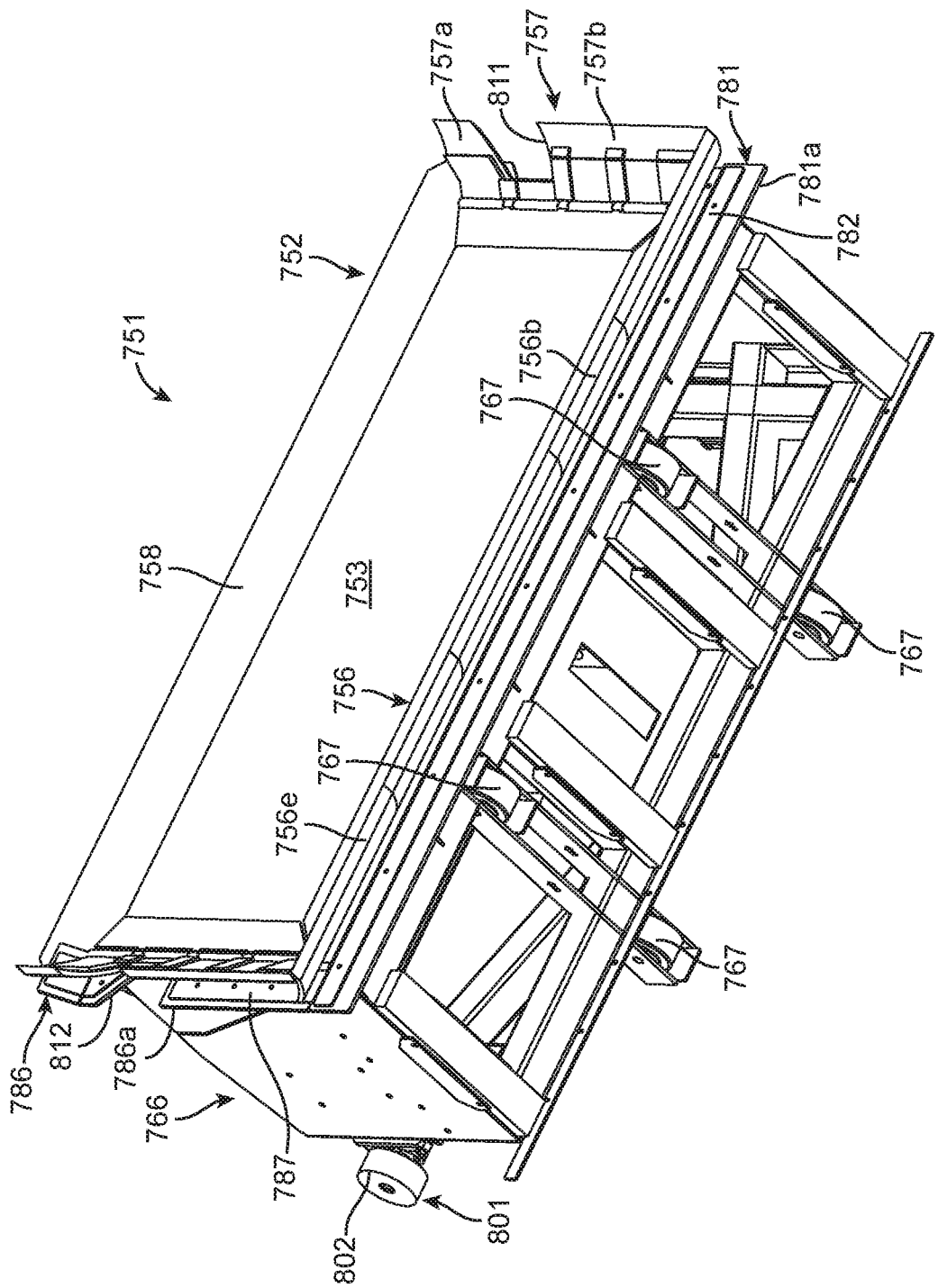
FIG. 27 is a bottom, front isometric view of the ejector of the dump trailer of FIG. 7, removed from the bed of the dump trailer.
Figure 28:
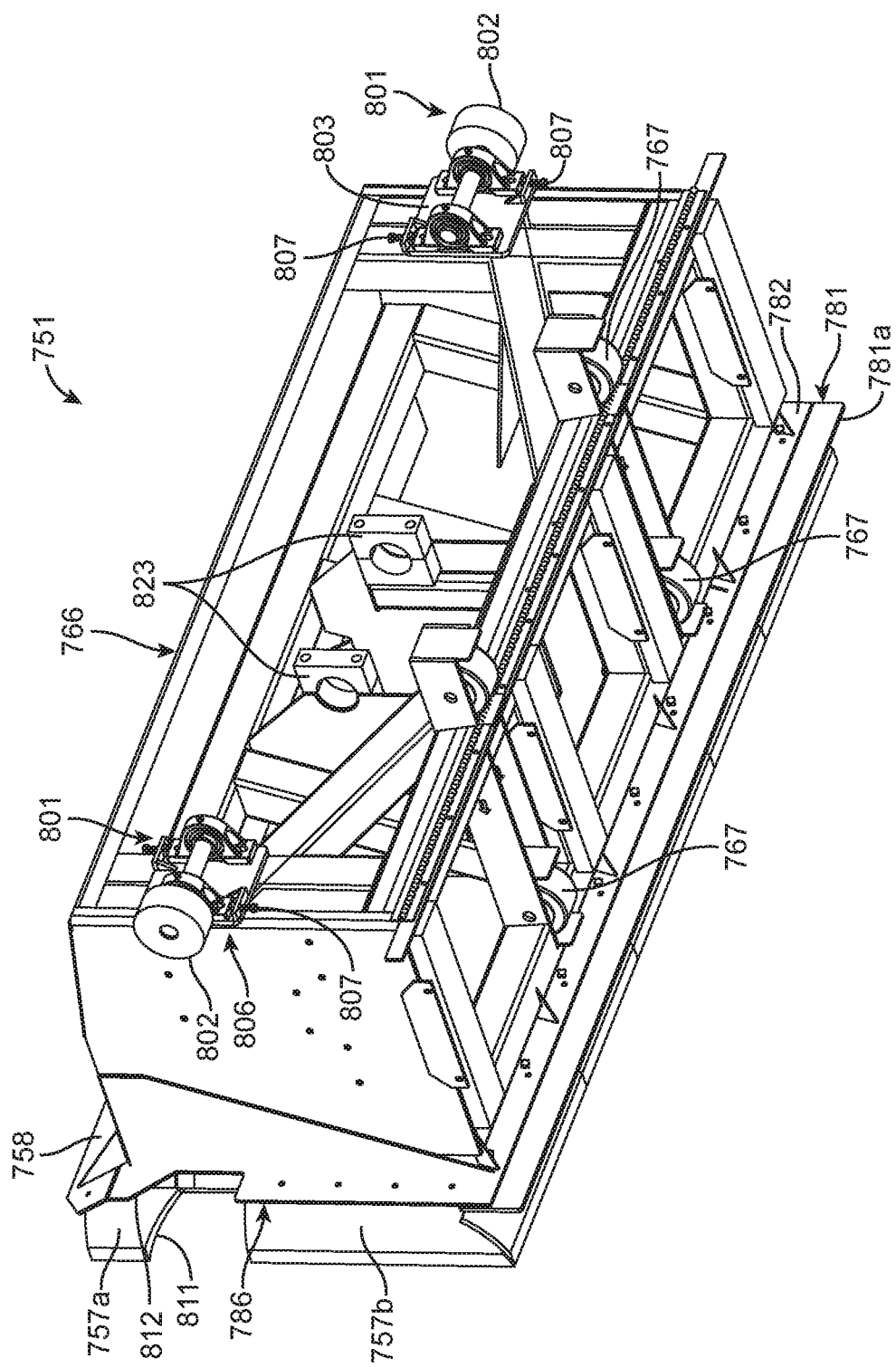
FIG. 28 is a bottom, back isometric view of the ejector of the dump trailer of FIG. 7, removed from the bed of the dump trailer.
Figure 29:
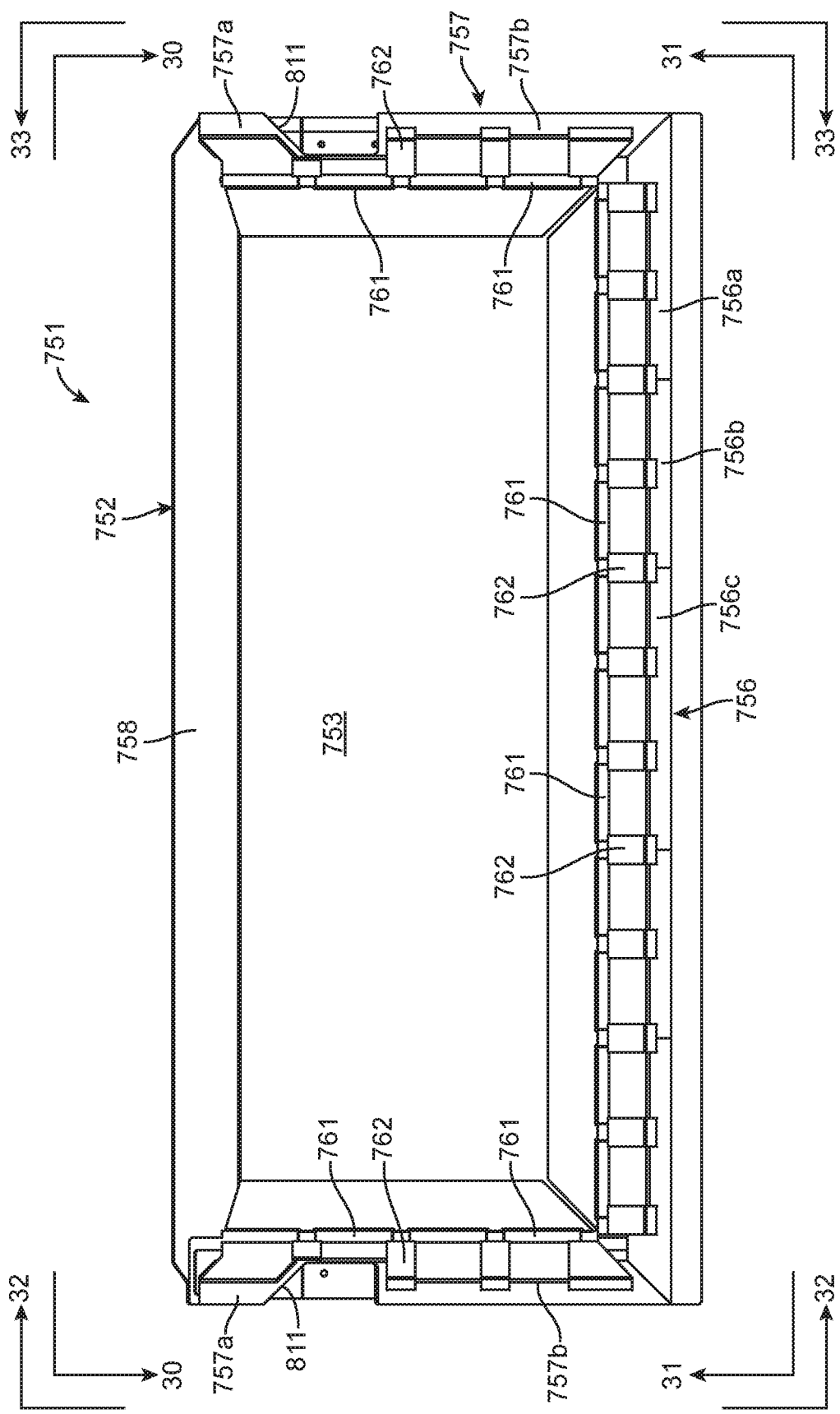
FIG. 29 is a front elevational view of the ejector of FIG. 25 taken along the line 29-29 of FIG. 25.
Figure 30:
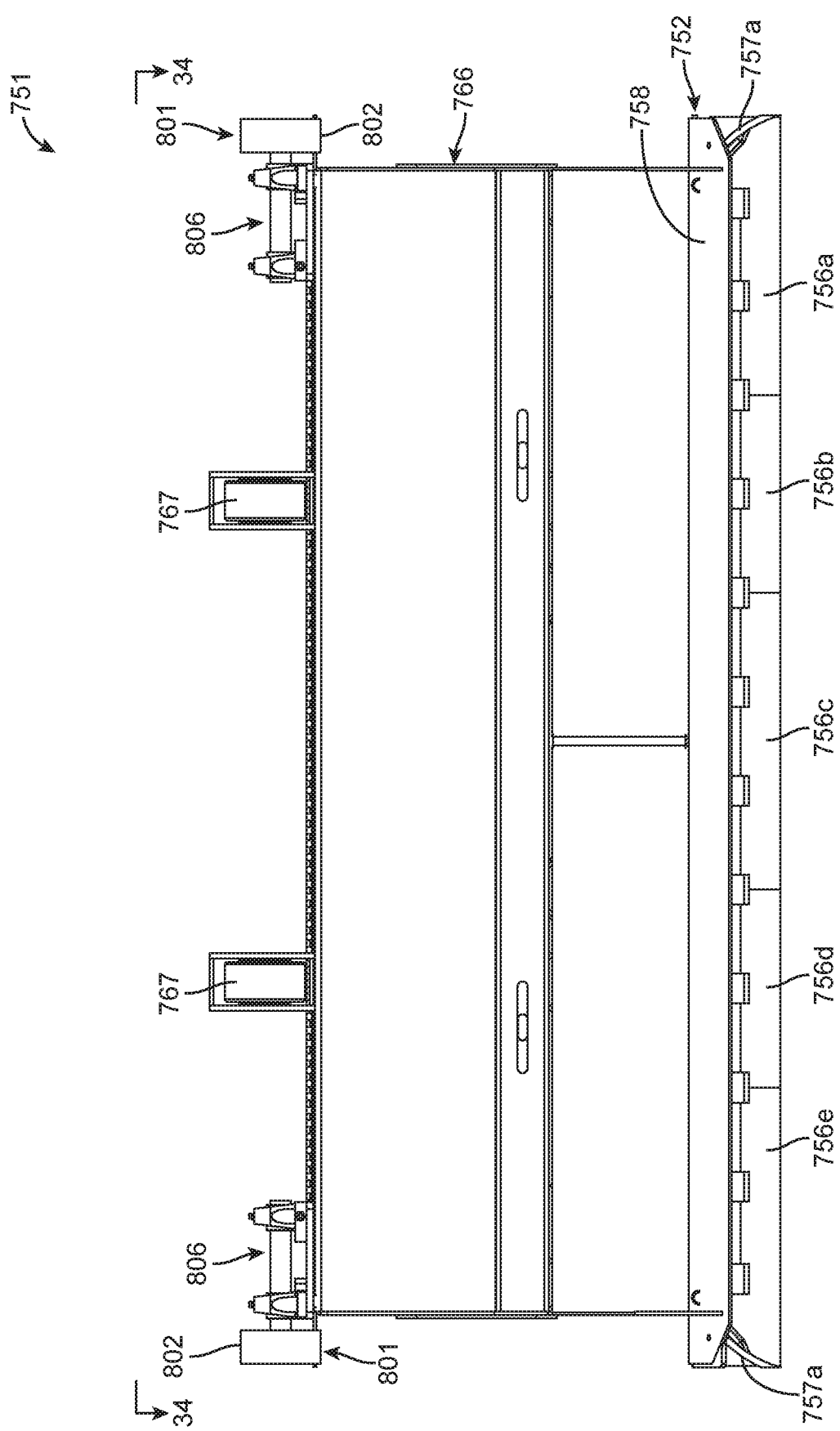
FIG. 30 is a top plan view of the ejector of FIG. 25 taken along the line 30-30 of FIG. 29.
Figure 31:
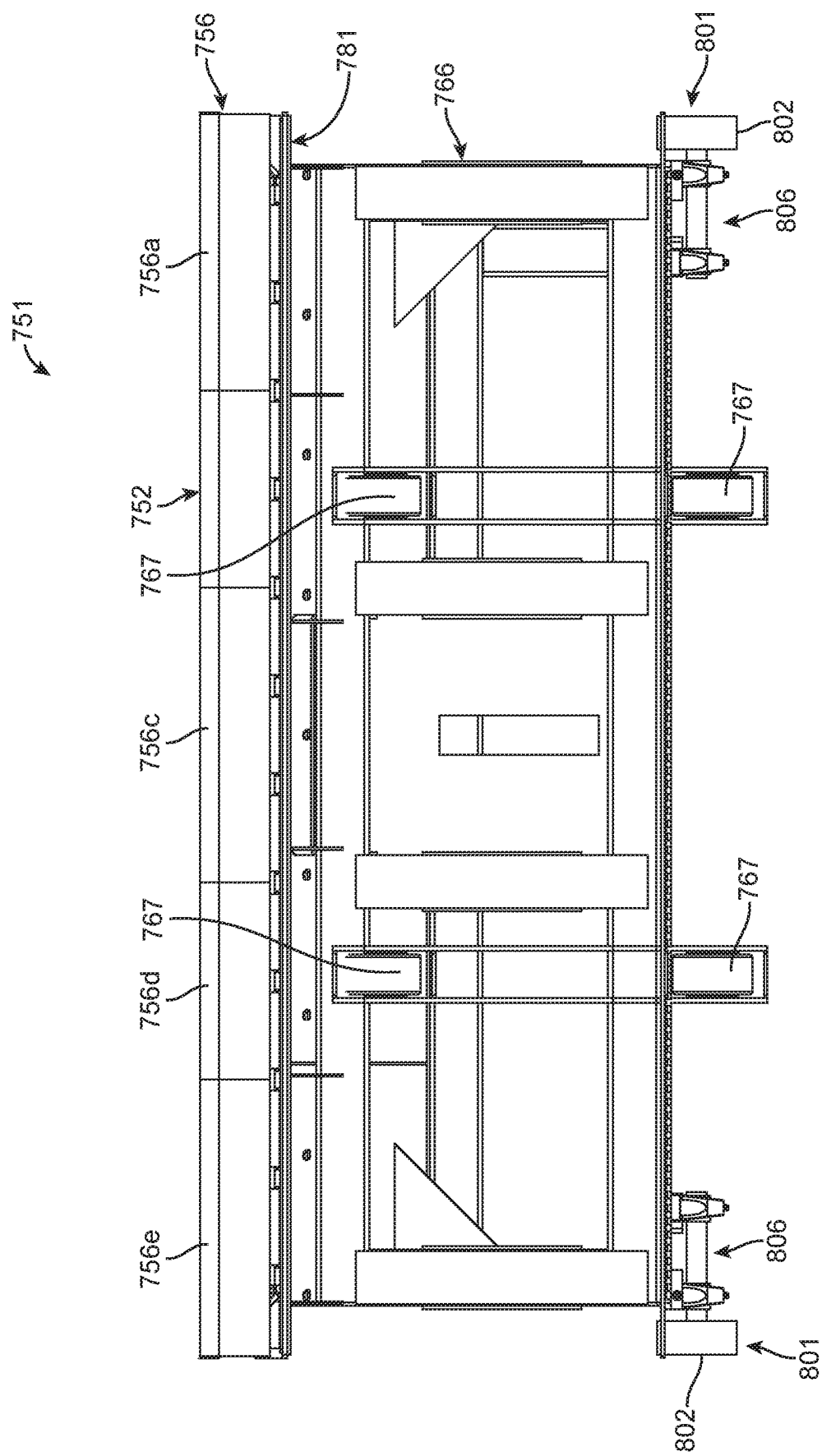
FIG. 31 is a bottom plan view of the ejector of FIG. 25 taken along the line 31-31 of FIG. 29.
Figure 32:
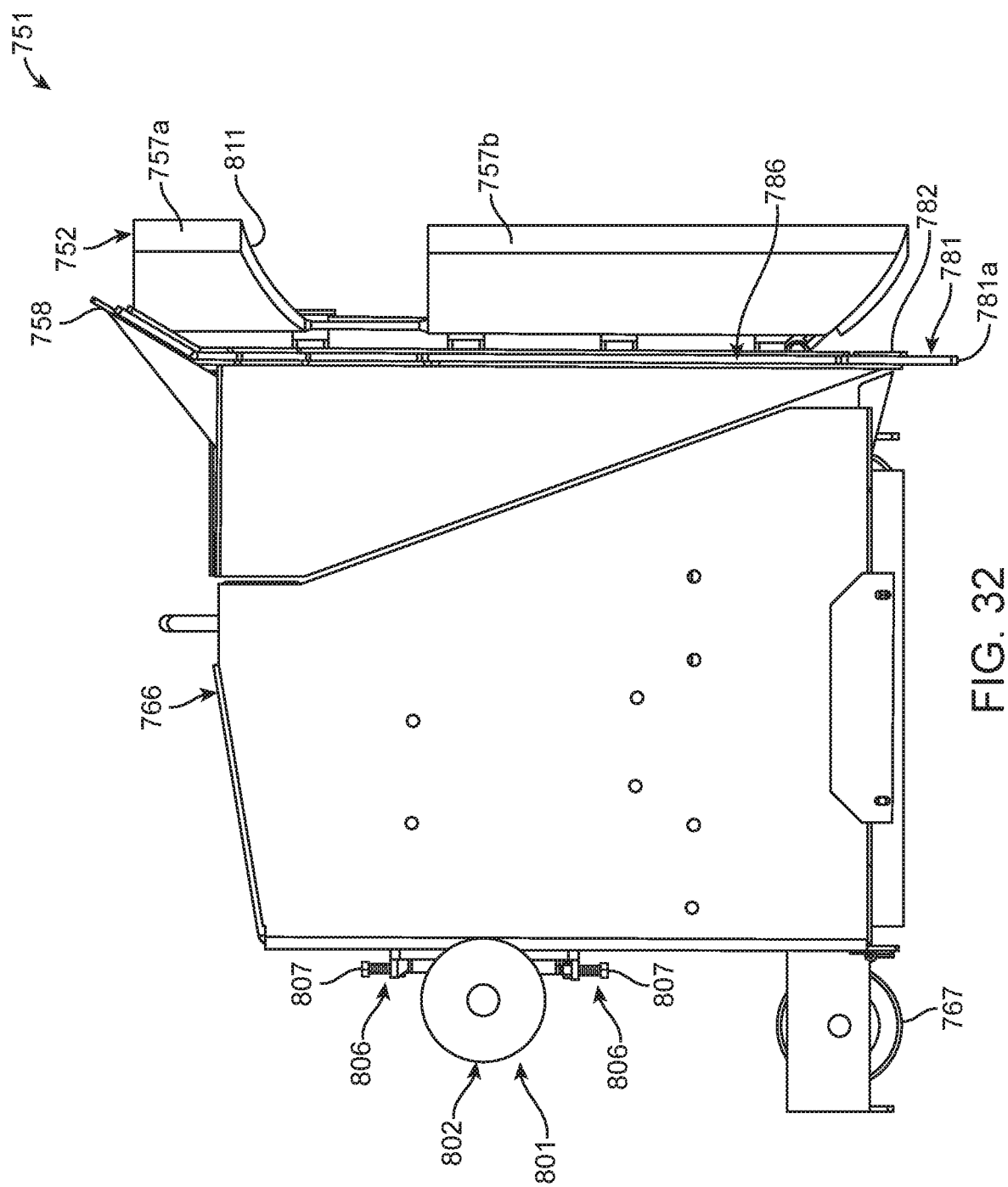
FIG. 32 is a left side elevational view of the ejector of FIG. 25 taken along the line 32-32 of FIG. 29.
Figure 33:
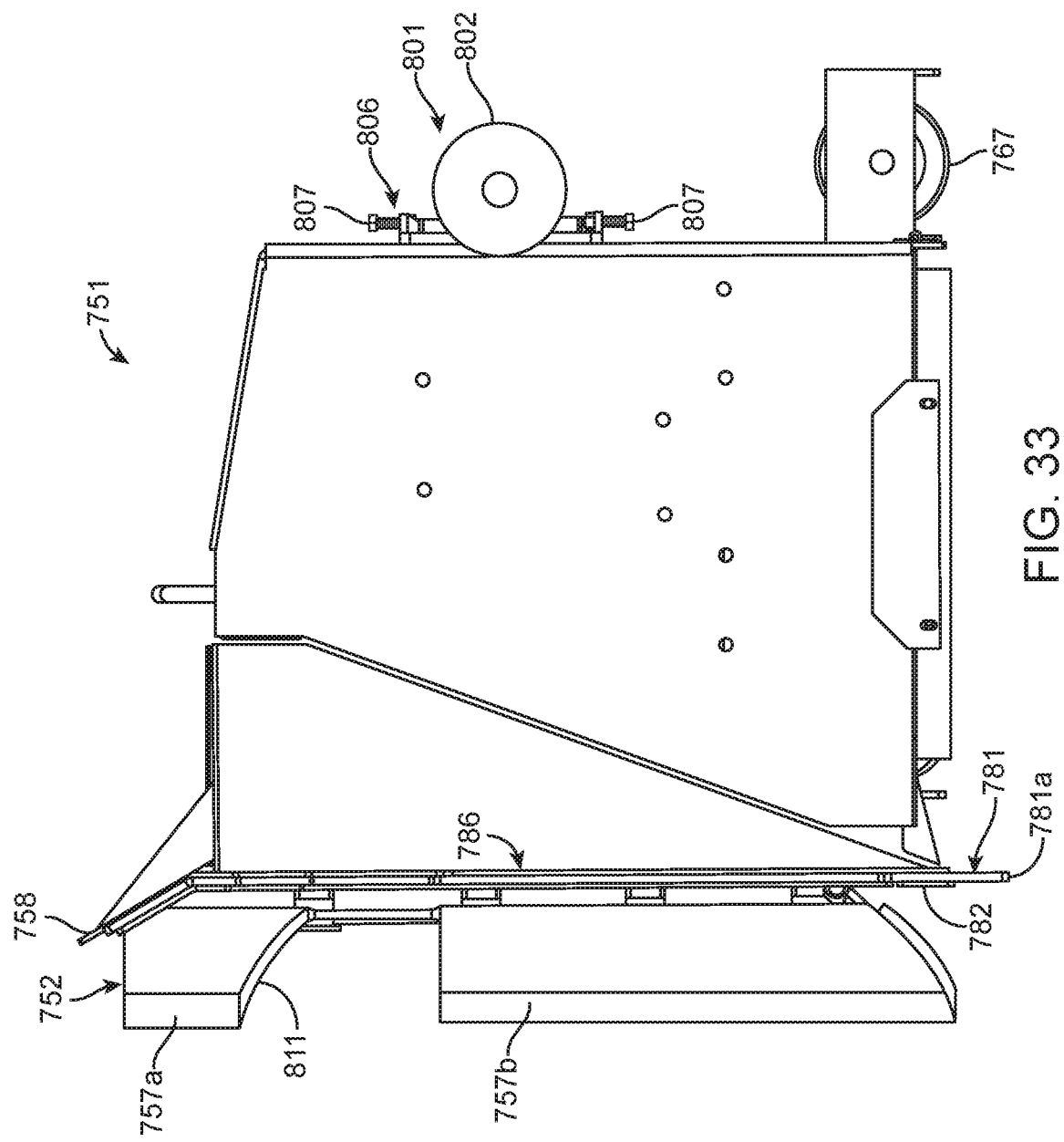
FIG. 33 is a right side elevational view of the ejector of FIG. 25 taken along the line 33-33 of FIG. 29.
Figure 34:
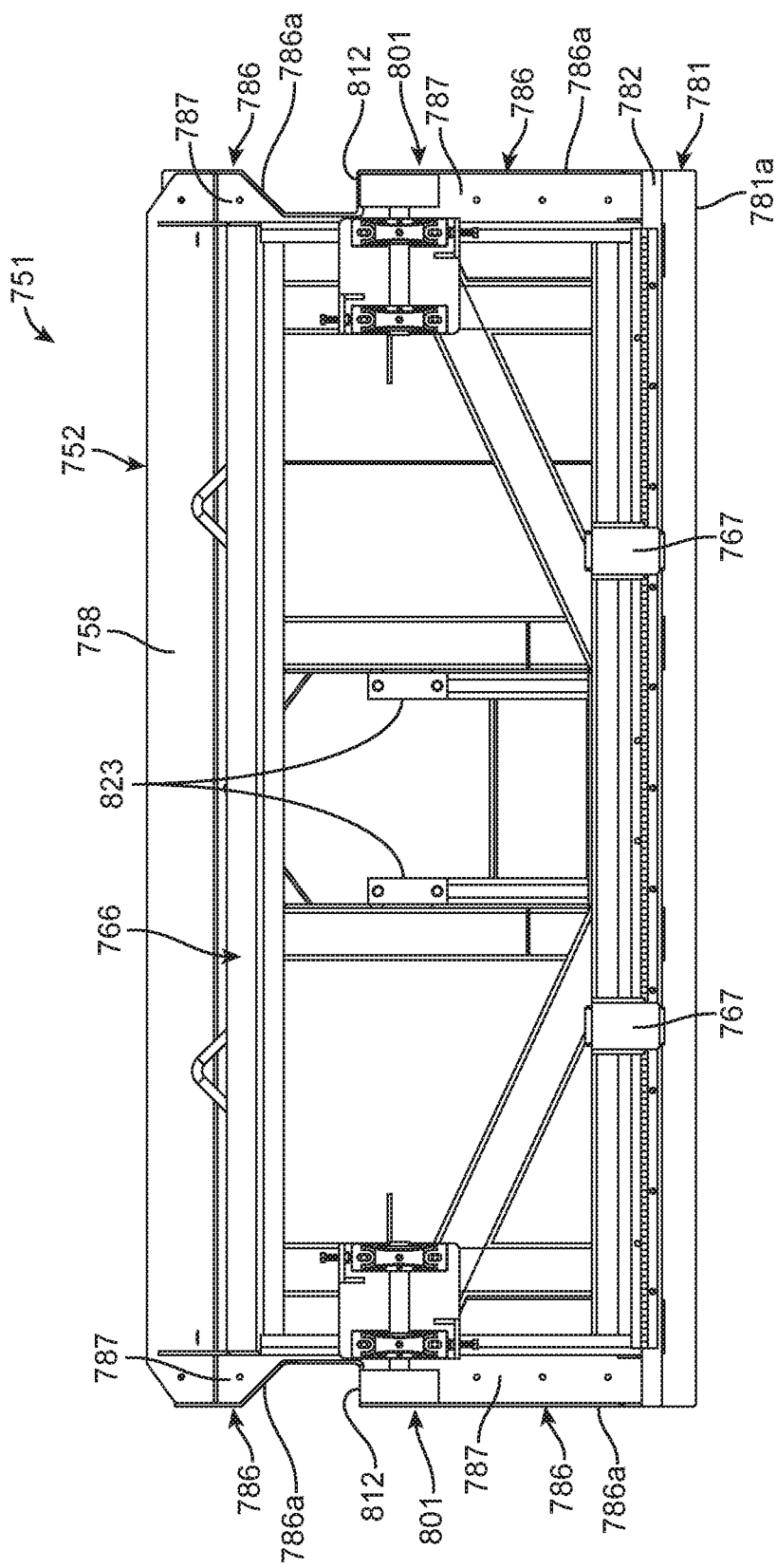
FIG. 34 is a rear elevational view of the ejector of FIG. 25 taken along the line 34-34 of FIG. 29.
Figure 35:
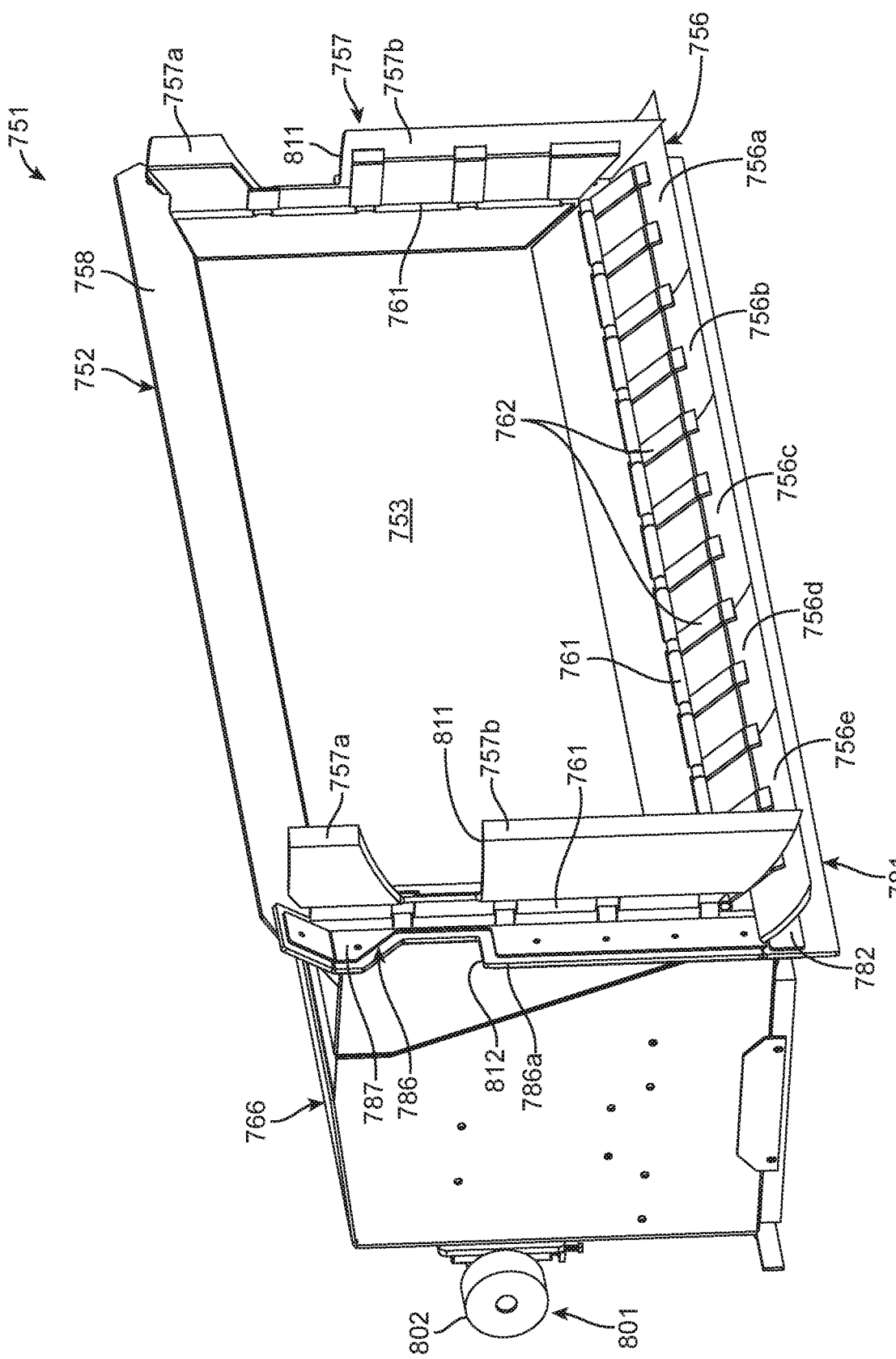
FIG. 35 is a top, front isometric view of the ejector of FIG. 25 with the side blade portions of the ejector in a second position.
Figure 36:
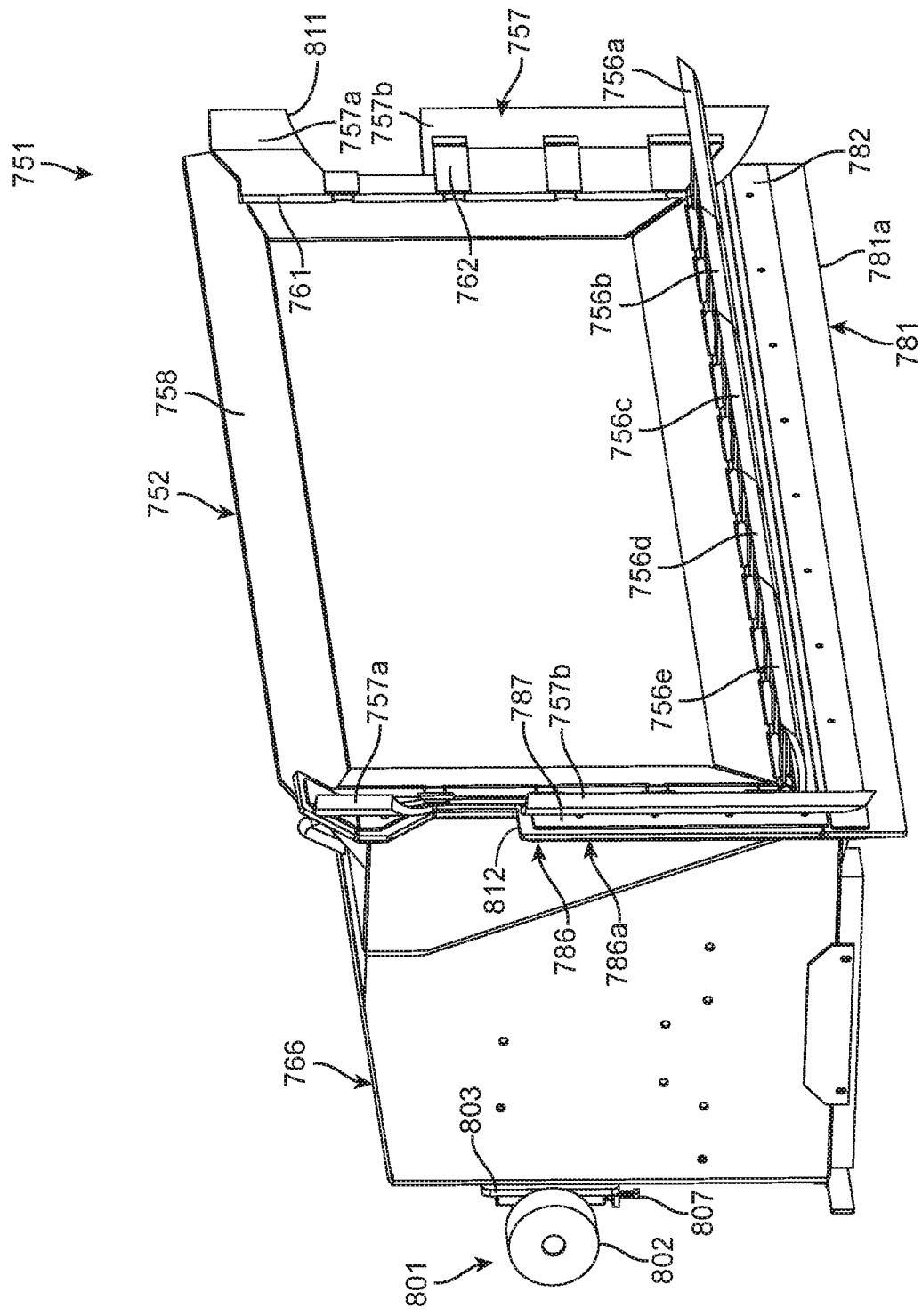
FIG. 36 is a top, front isometric view of the ejector of FIG. 25 with the bottom blade portions of the ejector in a second position.

Dump trailer 701 optionally includes an actuator 821 of any suitable type for longitudinally moving dump mechanism 751, and blade 752 carried thereby, between their first and second positions within open bed 726, including when blade 752 is pushing cargo within the open bed out rear opening 742 of the bed. The actuator 821 is secured to frame 702 by any suitable means, and optionally secured to forward extension 707 by any suitable means such as one or more brackets and fasteners. The actuator 821 can optionally include a telescoping piston 822 movable between a contracted position when blade 752 is in its first position and an extended position when the blade is in its second position. The piston 822 can be secured to dump mechanism 751, for example the rear of rollable sport 766, by any suitable means such as a bracket 823 provided on the rear of the rollable sport. When piston 822 is in a fully retracted position, for example as shown in FIGS. 24-25, the piston can be fully or substantially recessed within forward extension 707 of frame 702. The actuator 821 can optionally include a suitable pneumatic assembly or hydraulic assembly, for extending and retracting the piston 822. Such a hydraulic assembly can optionally include a valve assembly 824 that can optionally be carried by the forward extension, as shown in FIGS. 23-24, or by the tractor unit 602 to which the dump trailer is attached. The hydraulic assembly can be powered by any suitable means, for example by a power take-off of the tractor unit 602 or otherwise by the tractor unit.

Actuator 821 can optionally be disposed within forward extension 707, which as discussed above can be referred to as the gooseneck of dump trailer 701. Actuator 821 can optionally be entirely disposed within the confines of the forward extension 707. Actuator 821 can optionally be nested within the forward extension 707. Actuator 821 can optionally not extend above the top of forward extension 707. Actuator 821 can optionally not extend above the top of open bed 726. Actuator 821 can optionally not extend above the top of dump trailer 701. The disposition of actuator 821 within forward extension 707 facilitates the low-profile nature of dump trailer 701. For example, the disposition of actuator 821 within forward extension 707 facilitates open bed 726 being disposed partially or entirely below the top of the forward extension. The disposition of actuator 821 within forward extension 707 permits blade 752 to travel a distance along the open bed 726 of at least about 95% of the internal length of the bed 726. The travel distance of the blade 752 can optionally exceed the length of the open bed 726 when actuator 821 is configured to move the blade 752 out over a fully extended tailgate in an open horizontal configuration.

Dump trailer 701 can optionally include one or more cover plates 826 removably joined to the top of forward extension 707 for protecting actuator 821 from cargo being loaded within open bed 726. Front wall 729 of the open bed 726 is optionally provided with an opening 827 therethrough for permitting the piston 822 to extend through the wall 729.

The dump trailer of the invention can optionally include an open bed that is pivotally coupled to the rear 706b of frame main portion 706 so that the front of the open bed can be pivoted from a first position in which the open bed is in a substantially horizontal position, for example parallel to frame main portion 706, and a second position which the front of the open bed is inclined upwardly relative to rear 706b of the main frame portion 706. Such a dump trailer can be used when the open bed is in its first position for loading and hauling of cargo, and used when the open bed is in its second position for discharging cargo from the open bed through a rear opening of the bed. Such discharging of cargo can occur by gravity, and can be enhanced by mechanical means if desired.

Figure 8:
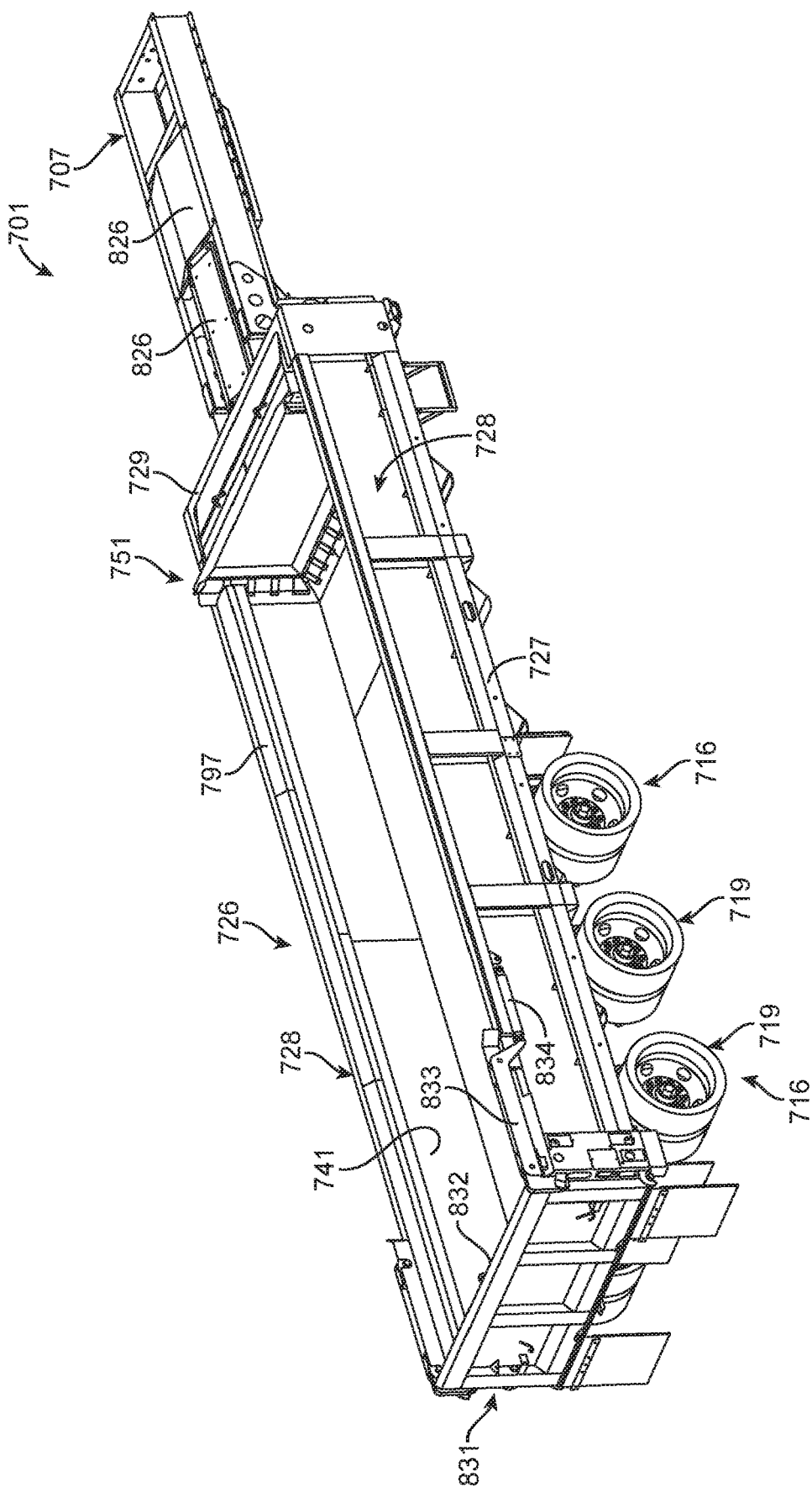
FIG. 8 is another back isometric view of the dump trailer of FIG. 7.
Figure 9:
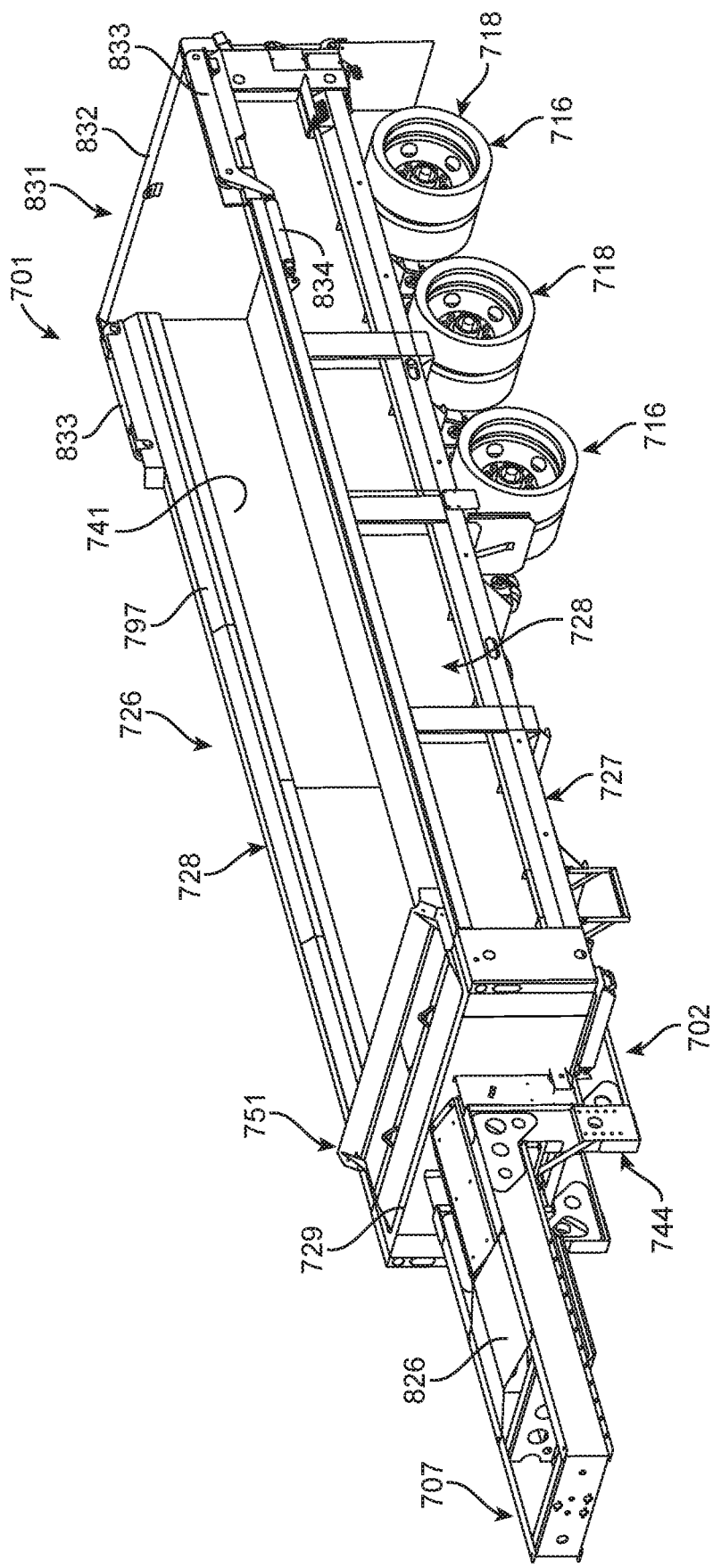
FIG. 9 is a front isometric view of the dump trailer of FIG. 7.
Figure 10:
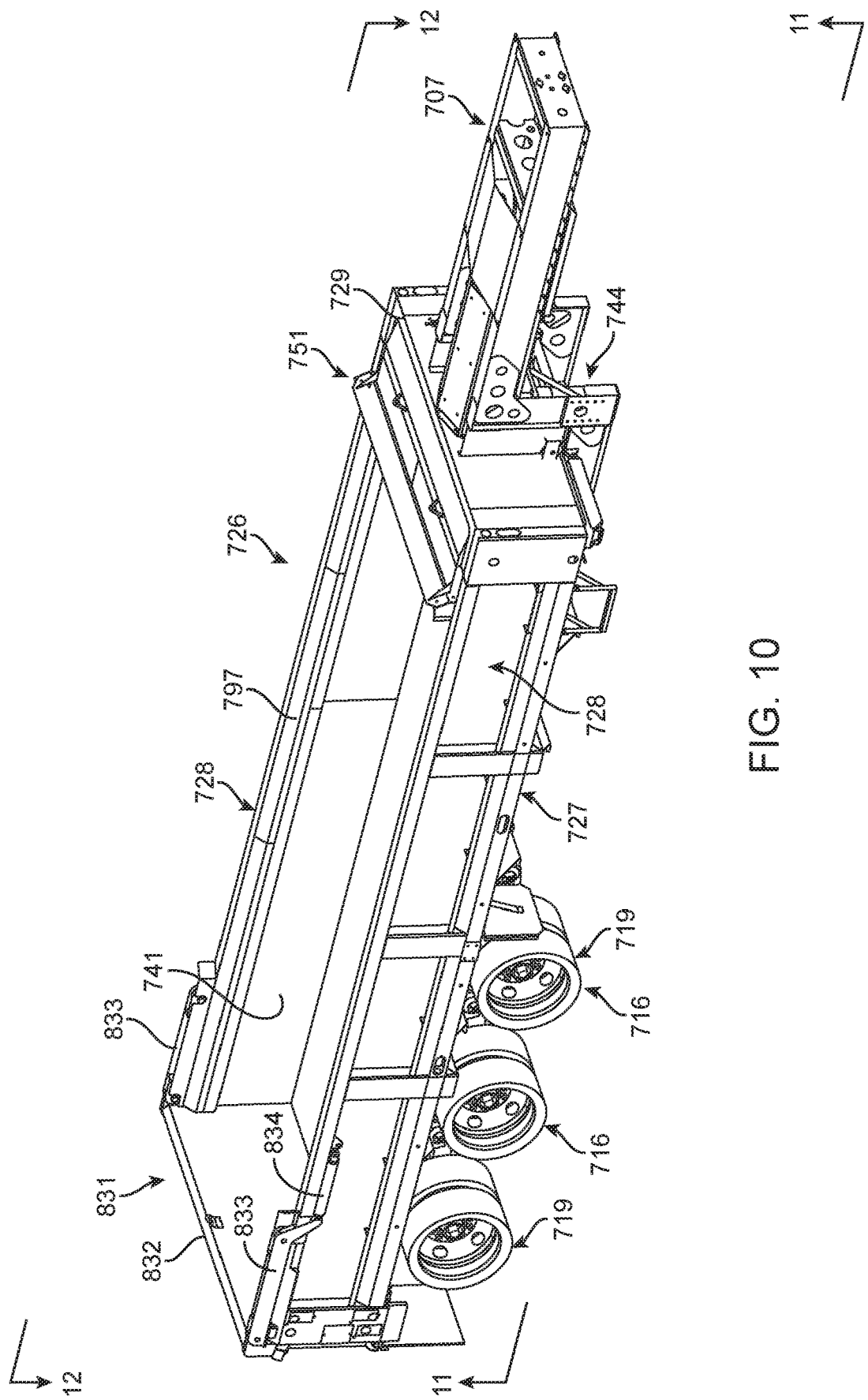
FIG. 10 is another front isometric view of the dump trailer of FIG. 7.
Figure 11:
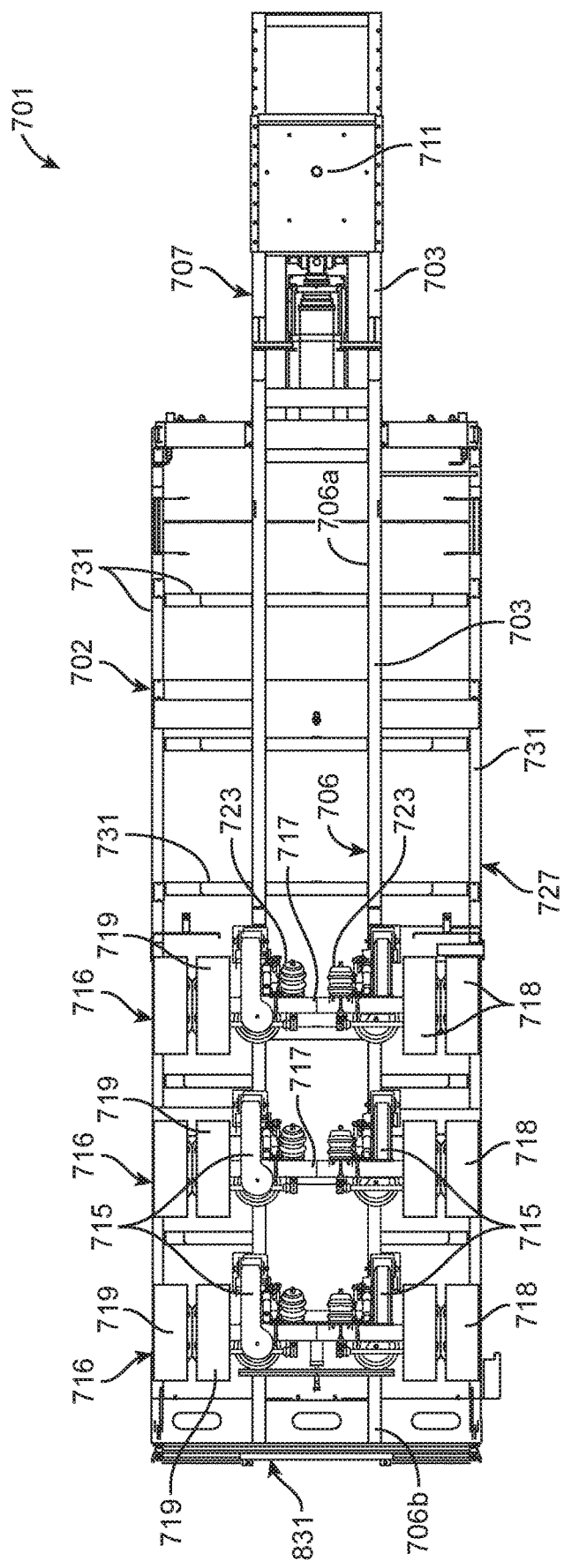
FIG. 11 is a bottom plan view of the dump trailer of FIG. 7 taken along the line 11-11 of FIG. 10.
Figure 12:
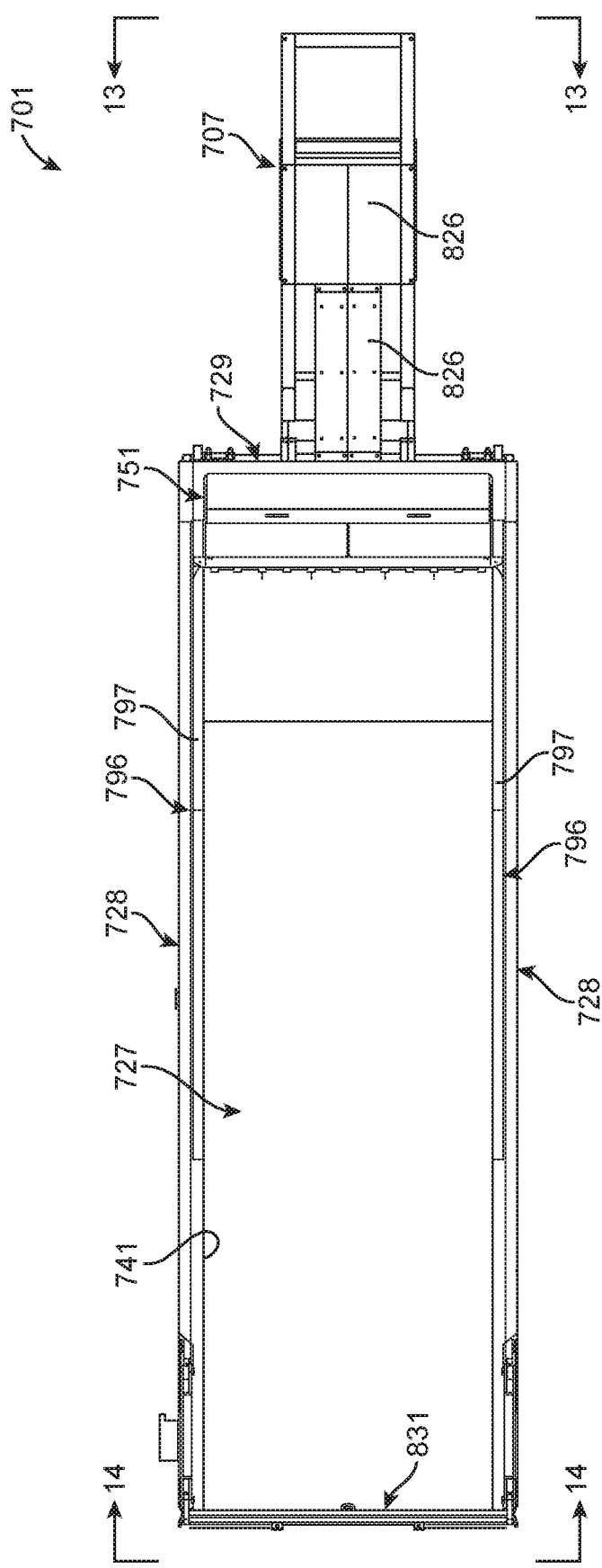
FIG. 12 is a top plan view of the dump trailer of FIG. 7 taken along the line 12-12 of FIG. 10.
Figure 13:
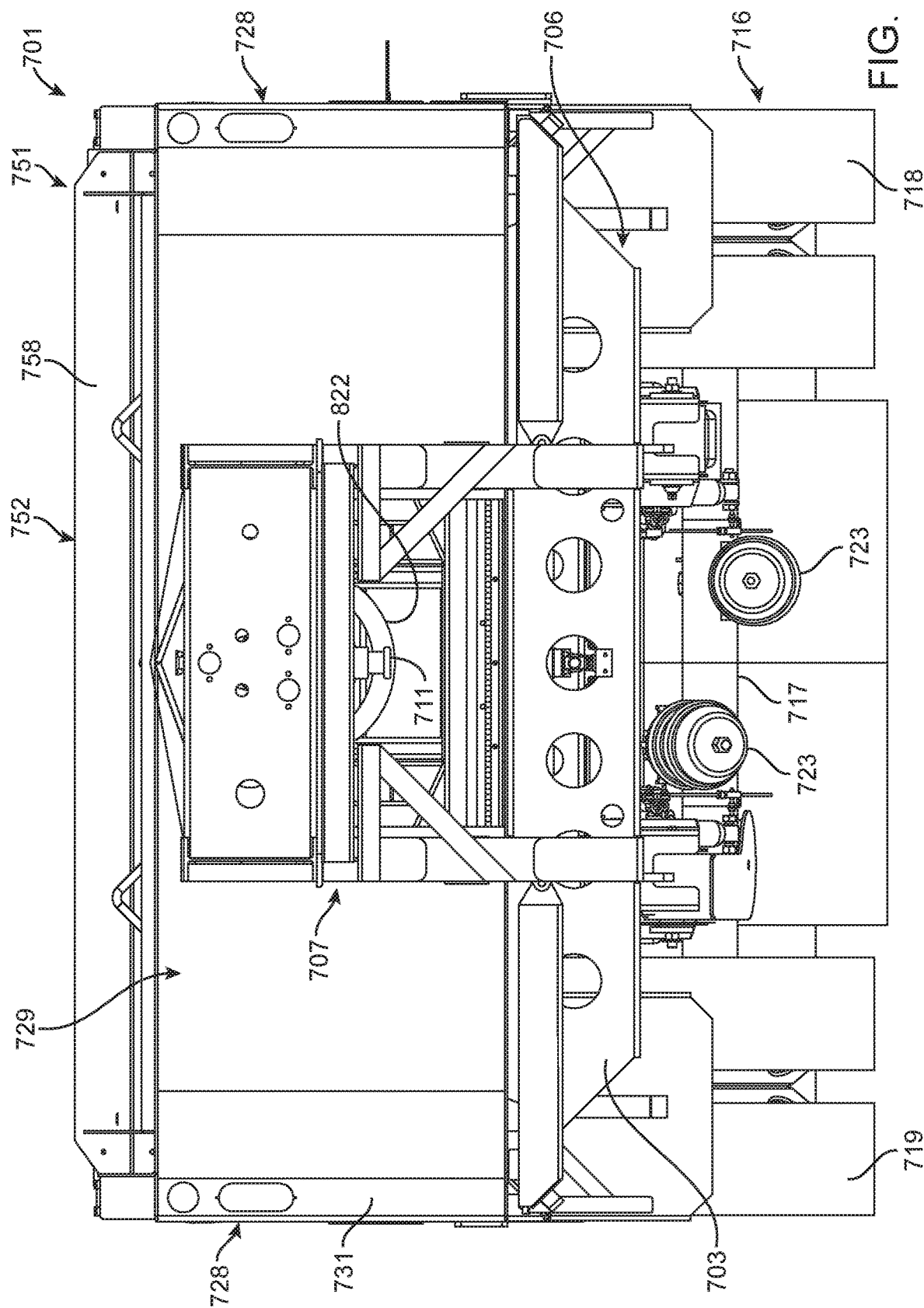
FIG. 13 is a front elevational view of the dump trailer of FIG. 7 taken along the line 13-13 of FIG. 12.
Figure 14:
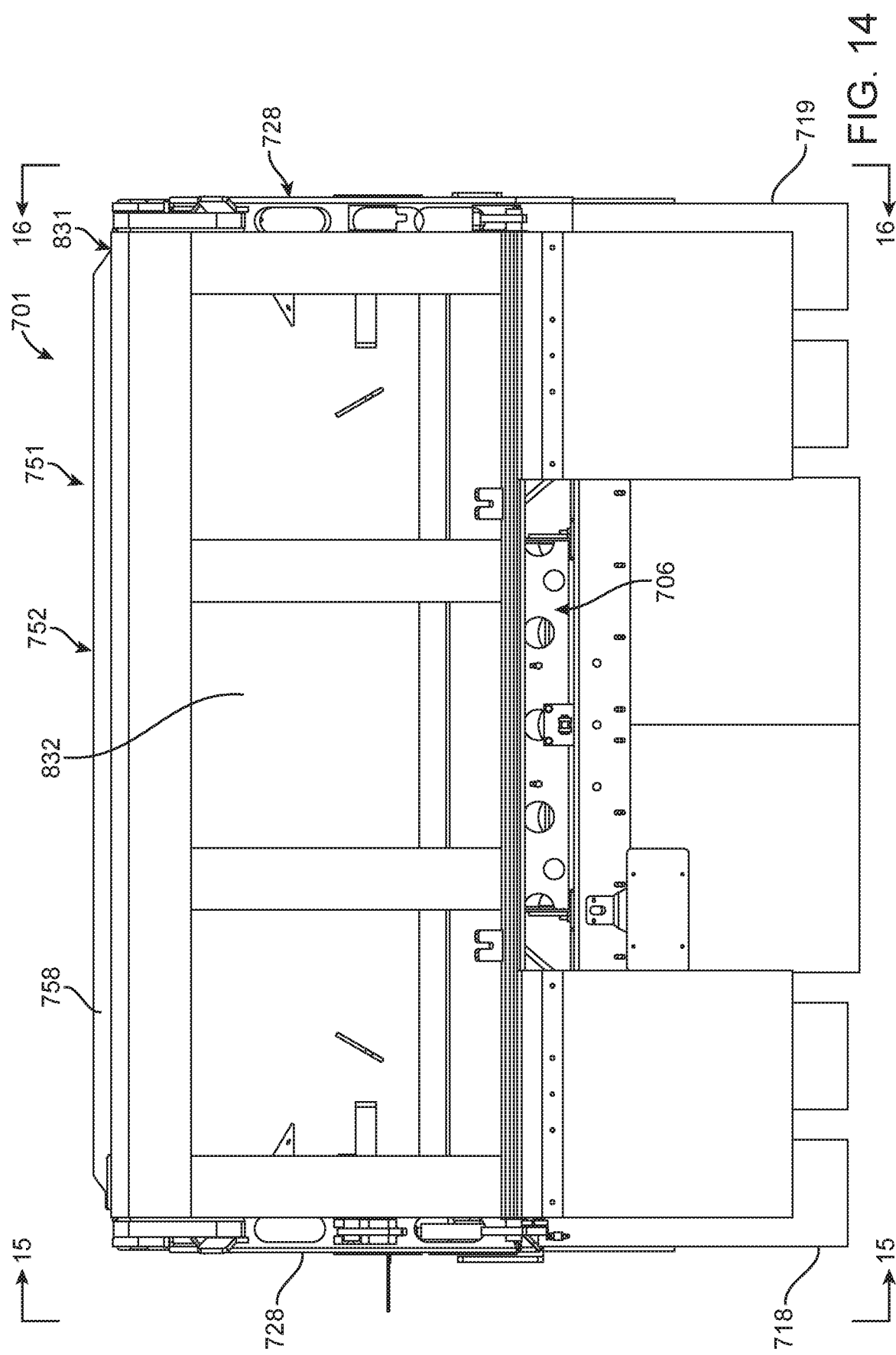
FIG. 14 is a rear elevational view of the dump trailer of FIG. 7 taken along the line 14-14 of FIG. 12.

Dump trailer 701 can optionally include a tailgate 831 for removably covering rear opening 742 of the open bed 726, for example during loading of the open bed with cargo and during travel of the dump trailer 701. Tailgate 831 can be any suitable type and can optionally include a cover 832 having a size and shape approximating the size and shape of the rear opening 742. Cover 832 can optionally be movable between a first position, for example a closed position as shown in FIGS. 8-10, in which the cover extends over and closes opening 742, and a second position, for example an opened position as shown in FIGS. 18-21, in which the cover does not extend over or close opening 742. The second position of cover 832 can optionally be above the opening 742 for facilitating the removal of cargo from the open bed during emptying of dump trailer 701. Cover 832 can optionally extend in a horizontal position, for example above the opening 742, when in its second position for facilitating the removal of cargo from the open bed 726. Cover 832 can be movably or pivotally coupled to open bed 726 by any suitable means, for example first and second arms 833. An actuator 834 can optionally be coupled to each of arms 833 for moving cover 832 between his first and second positions.

In operation and use, the dump trailer of the invention, for example dump trailer 701, can be loaded with cargo, such as debris, for transporting the cargo from a first location to a second location. Open bed 726 of the dump trailer can be loaded by any suitable means, for example manually by workers or mechanically by any suitable construction loading equipment. The low-profile nature of dump trailer 701 facilitates the loading of open bed 726 by compact construction equipment. For example, such compact construction equipment may not have a sufficient reach for loading a conventional dump truck or trailer having a height greater than the top height of open bed 726. The low-profile nature of dump trailer 701 further inhibits the construction loading equipment from undesirably engaging overhanging hazards such as trees and electrical lines during loading of the trailer. Tailgate 31 is optionally closed, for example in its first position, when open bed 726 is being loaded. During travel, the low-profile nature of dump trailer 701 can desirably inhibit the trailer from contacting overhanging structures, trees and electrical lines. Upon reaching the second location, tailgate 831 can be moved to its second or open position and dump mechanism 751 utilized to push the cargo being carried by the dump trailer out of open bed 726, for example out rear opening 742. In this regard, for example, blade 752 can be moved from a first position at the front of the open bed 726 to a second position at the back opening of the open bed 726. The retention of open bed 726 in a non-pivoted position during unloading desirably maintains a relatively low center of gravity for dump trailer 701 and tractor unit 602 so as to reduce tipping of the dump trailer during unloading.

All of the dimensions, ratios and number disclosed above can optionally pertain to dump trailer 701.

In one aspect of the invention, a dump trailer for hauling and discharging cargo can be provided and can include a chassis support frame, an open-top bed coupled in substantially fixed relationship to the chassis support frame to prevent tilting of the open-top bed relative to the chassis support frame, the open-top bed having a tailgate opening at the rear of the open-top bed, a tailgate located at the rear of the open-top bed, the tailgate being selectively positionable between a closed configuration covering the tailgate opening and an open configuration away from the tailgate opening, a nose coupled to the chassis frame and extending forward of the bed, the nose supporting a hydraulic cylinder that is arranged for selective extension and retraction movement along a longitudinal path of travel extending forward and rearward along the bed, a blade coupled with the hydraulic cylinder for motion along the path of travel concomitant with the selective extension and retraction movement such that rearward extension of the hydraulic cylinder when cargo is in the bed pushes the cargo from the bed and through the tailgate opening, the nose having a trailer hitch connector, at least one wheel/axle assembly coupled to the chassis support frame for support thereof, the bed having right and left sidewalls running in parallel to the longitudinal path of travel, each of the opposed sidewalls having a guide rail running in parallel to the longitudinal path of travel, the blade having a right lateral edge facing the right sidewall and a left lateral edge facing the left sidewall, the left lateral edge defining a recess of complimentary dimensions for receipt of the guide rail on the left sidewall, the right lateral edge defining a recess of complimentary dimensions for receipt of the guide rail on the right sidewall, whereby the guide rails stabilize the blade along the path of travel.

The blade can have a bottom that is tilted rearwardly from the top. The blade can have a concave rearward facing surface. The trailer hitch connector can be a fifth wheel connector, and the trailer can be constructed and arranged to support at least 45,000 pounds of cargo. The dump trailer open box can have a maximum height of about six feet.

In one aspect of the invention, a method of dumping can be provided and include coupling the dump trailer with a motive means, filling the trailer with cargo in a configuration where the blade resides at a forward position of the bed and the tailgate is in the closed configuration, operating the motive means with the push dump trailer attached to haul the cargo from a first location to a second location, opening the tailgate to place the tailgate in the open configuration and actuating the hydraulic cylinder to move the blade rearward with concomitant discharge of the cargo.

The dump trailer of the invention advances the art and overcome certain problems thereof by providing a low-profile dump trailer. The bed of the trailer optionally includes a discharge mechanism, for example utilizing a hydraulically actuated blade or ram to push cargo out of a rear opening of the bed. The bed optionally includes a rear tailgate at the rear opening. The blade can optionally be stabilized during movement down the bed by the use guide rails mounted on sidewalls of the bed. The dump trailer optionally includes a forward extending nose upon which an hydraulic cylinder may optionally be mounted, for moving the blade down the bed, so as not to occupy internal cargo space of the bed. The dump trailer can optionally be configured so that the bed tilts relative to a chassis frame supporting the bed for emptying cargo in the bed through a rear opening in the bed.

Limiting the height of the dump trailer can be beneficial. For example, a fixed bed trailer, that is one that cannot be lifted or rolled off of a chassis without disassembly, with a height of less than six feet can facilitate loading the vehicle while avoiding most overhead obstacles such as overhead wires on a construction site. The low-profile dump trailer of the invention is particularly suited for use with compact construction equipment. The dump trailer can advantageously permit the driver of the tractor unit to see over the trailer, for example in construction zones, to assist in identifying safety hazards. Constructing a trailer of this height that is capable of hauling 16 to 20 yards of material is unique in the art where standard dump trucks with this type of load rating are tall and difficult or impossible to load when confronted with the problem of overhead obstacles. The lower height also advantageously imparts a lower center of mass, resulting in fewer rollover accidents in relationship to road handling characteristics.

We claim:

1. A low profile dump trailer for use with a tractor unit having at least one rear wheel and axle assembly with left and right wheels each with a new tire diameter, comprising a goose neck adapted for removable coupling to the tractor unit and a dropped frame joined to the goose neck and extending rearwardly of the goose neck, the dropped frame having a front and a rear and a top and a bottom, an open bed joined to the top of the dropped frame sized for hauling 16 to 20 yards of cargo and having a front and having a rear opening for permitting discharge of the cargo from the open bed, the goose neck having a height above the dropped frame and the open bed having a top height above the dropped frame approximating the height of the goose neck for providing the open bed with a low profile, a plurality of trailer wheel and axle assemblies joined to the bottom of the rear of the dropped frame, each of the plurality of trailer wheel and axle assemblies having left and right wheels suitable for highway travel, each of the left and right wheels of the plurality of trailer wheel and axle assemblies being disposed entirely underneath the open bed and having a new tire diameter smaller than the new tire diameter of the left and right wheels of the at least one rear wheel and axle assembly of the tractor unit.

2. The dump trailer of claim 1, wherein the open bed has a top height above ground selected from the group consisting of between five and six feet, 5.25 feet (63 inches), 5.50 feet (66 inches), 5.67 feet (68 inches), 6.00 feet (72 inches) and 7.00 feet (84 inches).

3. The dump trailer of claim 1, wherein the open bed has a bottom height above ground ranging from 30 to 36 inches.

4. The dump trailer of claim 1, wherein the left and right wheels of the tractor unit each have a new tire diameter and the left and right wheels of the trailer wheel and axle assemblies each have a new tire diameter being a percentage of the new tire diameter of the left and right wheels of the tractor unit selected from the group consisting of 68%, 75%, 80% and 83%.

5. The dump trailer of claim 1, wherein the left and right wheels of the trailer wheel and axle assemblies each have a new tire diameter selected from the group consisting of 30 inches and ranging from 29 to 44 inches.

6. The dump trailer of claim 1, further comprising a dump mechanism for emptying the open bed.

7. The dump trailer of claim 6, wherein the open bed is tiltably coupled to the rear of the dropped frame and the dump mechanism includes an actuator joined to the front of the dropped frame and the open bed for tilting the front of the open bed upwardly relative to the dropped frame for emptying the open bed.

8. The dump trailer of claim 6, wherein the dump mechanism includes a blade slidably disposed within the open bed and an actuator joined to the blade for urging the blade rearwardly within the open bed towards the rear opening for emptying the open bed.

9. The dump trailer of claim 1, wherein the open bed has a length to height ratio selected from the group consisting of 9:1, 9.375:1, 9.6:1, 11.25:1, ranging from 9:1 to 9:4 and ranging from 9:1 to 11.25:1.

10. The dump trailer of claim 1, wherein the open bed has a load capacity in cubic yards at sea level to height in feet ratio selected from the group consisting of 5:8:1, 7:1, 8.6:1 and ranging from 7:1 to 8.6:1.

11. The dump trailer of claim 1, wherein the open bed has a bottom that is positioned above the left and right wheels of the trailer wheel and axle assemblies a distance selected from the group consisting of 0.25 inch, 6.0 inch and ranging from 0.25 to 6.0 inches.

12. A dump trailer for use with a tractor unit having at least one rear wheel and axle assembly with left and right wheels and with construction loading equipment, comprising a goose neck adapted for removable coupling to the tractor unit and an open bed joined to the goose neck and extending rearwardly of the goose neck for receiving cargo, the open bed having a bottom and a rear opening, a plurality of trailer wheel and axle assemblies joined to the bottom of the open bed, each of the plurality of trailer wheel and axle assemblies having left and right wheels suitable for highway travel, a blade slidably disposed within the open bed and an actuator disposed entirely within the confines of the goose neck and joined to the blade for urging the blade rearwardly within the open bed towards the rear opening for emptying the open bed.

13. The dump trailer of claim 12, wherein the open bed has a length to height ratio selected from the group consisting of 9:1, 9.375:1, 9.6:1, 11.25:1, ranging from 9:1 to 9:4 and ranging from 9:1 to 11.25:1.

14. The dump trailer of claim 12, wherein the actuator is selected from the group consisting of a pneumatic actuator and a hydraulic actuator.

15. The dump trailer of claim 12, wherein each of the left and right wheels of the plurality of trailer wheel and axle assemblies is disposed entirely below the open bed and has a new tire diameter smaller than the new tire diameter of the left and right wheels of the at least one rear wheel and axle assembly of the tractor unit.

16. A low profile dump trailer for use with a tractor unit having at least one rear wheel and axle assembly with left and right wheels each with a new tire diameter, comprising a goose neck adapted for removable coupling to the tractor unit and a dropped frame joined to the goose neck and extending rearwardly of the goose neck, the dropped frame having a top and a bottom and a front and a rear, an open bed joined to the top of the dropped frame for receiving cargo and having a front and having a rear opening for permitting discharge of the cargo from the open bed, the open bed having a load capacity at water level ranging from 18.55 to 22.97 cubic yards and having a height above ground of between five and six feet for providing the open bed with a low profile, a plurality of trailer wheel and axle assemblies joined to the bottom of the rear of the dropped frame, each of the plurality of trailer wheel and axle assemblies having left and right wheels suitable for highway travel, each of the left and right wheels of the plurality of trailer wheel and axle assemblies being disposed entirely underneath the open bed and having a new tire diameter smaller than the new tire diameter of the left and right wheels of the at least one rear wheel and axle assembly of the tractor unit.

17. The dump trailer of claim 16, further comprising a dump mechanism for emptying the open bed.

18. The dump trailer of claim 17, wherein the open bed is tiltably coupled to the rear of the dropped frame and the dump mechanism includes an actuator joined to the front of the dropped frame and the open bed for tilting the front of the open bed upwardly relative to the dropped frame for emptying the open bed.

19. The dump trailer of claim 17, wherein the dump mechanism includes a blade slidably disposed within the open bed and an actuator joined to the blade for urging the blade rearwardly within the open bed towards the rear opening for emptying the open bed.

20. The dump trailer of claim 16, wherein the left and right wheels of the trailer wheel and axle assemblies each have a new tire diameter selected from the group consisting of 30 inches and ranging from 29 to 44 inches.

\* \* \* \* \*